US007983287B2

(12) United States Patent
Musacchio et al.

(10) Patent No.: US 7,983,287 B2
(45) Date of Patent: Jul. 19, 2011

(54) BACKPRESSURE MECHANISM FOR SWITCHING FABRIC

(75) Inventors: John T. Musacchio, Berkeley, CA (US);
Jean Walrand, Berkeley, CA (US); Roy T. Myers, Jr., Santa Clara, CA (US);
Shyam P. Parekh, Orinda, CA (US);
Jeonghoon Mo, Sunnyvale, CA (US);
Gaurav Agarwal, San Jose, CA (US)

(73) Assignee: Agere Systems Inc., Allentown, PA (US)

( * ) Notice: Subject to any disclaimer, the term of this patent is extended or adjusted under 35 U.S.C. 154(b) by 242 days.

(21) Appl. No.: 12/120,533

(22) Filed: May 14, 2008

(65) Prior Publication Data
US 2008/0212472 A1    Sep. 4, 2008

Related U.S. Application Data

(63) Continuation of application No. 10/358,678, filed on Feb. 5, 2003, now Pat. No. 7,426,185.

(60) Provisional application No. 60/362,144, filed on Mar. 6, 2002.

(51) Int. Cl.
*H04L 12/56* (2006.01)
(52) U.S. Cl. .................................................. 370/415
(58) Field of Classification Search .................. 370/415
See application file for complete search history.

(56) References Cited

U.S. PATENT DOCUMENTS

| | | | |
|---|---|---|---|
| 5,280,470 A | 1/1994 | Buhrke et al. | 370/13 |
| 5,339,332 A | 8/1994 | Kammerl | 375/10 |
| 5,367,518 A | 11/1994 | Newman | 370/54 |
| 5,455,826 A | 10/1995 | Ozveren et al. | 370/60 |
| 5,475,682 A | 12/1995 | Choudhury et al. | 370/60 |
| 5,500,858 A * | 3/1996 | McKeown | 370/412 |
| 5,517,495 A * | 5/1996 | Lund et al. | 370/399 |

(Continued)

FOREIGN PATENT DOCUMENTS
WO  WO 00/64109 A1  10/2000

OTHER PUBLICATIONS

Adiseshu, Hari, et al., "A Reliable and Scalable Striping Protocol," Dept. of Computer Science, Washington University, St. Louis, MO, Jun. 3, 1996, 11 pages.

(Continued)

*Primary Examiner* — Chirag G Shah
*Assistant Examiner* — Yong Zhou
(74) *Attorney, Agent, or Firm* — Mendelsohn, Drucker, & Associates, P.C.; Steven Mendelsohn

(57) ABSTRACT

Roughly described, a packet switching fabric contains a separate queue scheduler for each combination of an input module and a fabric output port. The schedulers may also be specific to a single class of service. Each queue scheduler schedules its packets without regard to state of other input queues and without regard to packets destined for other output ports. In an aspect, the fabric manages per-flow bandwidth utilization of output port bandwidth capacity by monitoring the same and asserting backpressure toward the queue scheduler for any thread that is exceeding its bandwidth allocation. In another aspect, a switching fabric uses leaky buckets to apply backpressure in response to overutilization of downstream port capacity by particular subflows. In another aspect, a switching fabric includes a cascaded backpressure scheme.

19 Claims, 18 Drawing Sheets

U.S. PATENT DOCUMENTS

| | | | | |
|---|---|---|---|---|
| 5,754,120 | A | 5/1998 | Argentati | 340/876 |
| 5,796,956 | A * | 8/1998 | Jones | 709/233 |
| 5,859,835 | A | 1/1999 | Varma et al. | 370/229 |
| 5,903,735 | A | 5/1999 | Kidder et al. | 395/200.7 |
| 5,923,644 | A | 7/1999 | McKeown et al. | 370/230 |
| 5,926,459 | A | 7/1999 | Lyles et al. | 370/230 |
| 5,930,234 | A | 7/1999 | Yoshida | 370/232 |
| 5,938,749 | A | 8/1999 | Rusu et al. | 710/54 |
| 5,946,297 | A | 8/1999 | Calvignac et al. | 370/230 |
| 6,038,217 | A | 3/2000 | Lyles | 370/233 |
| 6,064,650 | A | 5/2000 | Kappler et al. | 370/232 |
| 6,064,651 | A | 5/2000 | Rogers et al. | 370/233 |
| 6,064,677 | A | 5/2000 | Kappler et al. | 370/414 |
| 6,075,791 | A | 6/2000 | Chiussi et al. | 370/412 |
| 6,078,585 | A | 6/2000 | Kakuma et al. | 370/395 |
| 6,101,193 | A | 8/2000 | Ohba | 370/429 |
| 6,134,217 | A | 10/2000 | Stiliadis et al. | 370/232 |
| 6,294,928 | B1 * | 9/2001 | Lytle et al. | 326/41 |
| 6,345,040 | B1 | 2/2002 | Stephens et al. | 370/232 |
| 6,359,861 | B1 | 3/2002 | Sui et al. | 370/230 |
| 6,388,992 | B2 | 5/2002 | Aubert et al. | 370/232 |
| 6,426,944 | B1 | 7/2002 | Moore | 370/236 |
| 6,625,160 | B1 | 9/2003 | Suzuki | 370/413 |
| 6,683,884 | B1 | 1/2004 | Howard | 370/412 |
| 6,721,273 | B1 * | 4/2004 | Lyon | 370/235 |
| 6,765,906 | B1 | 7/2004 | Suzuki | 370/389 |
| 6,810,031 | B1 | 10/2004 | Hegde et al. | 370/351 |
| 6,810,426 | B2 | 10/2004 | Mysore et al. | 709/234 |
| 7,023,841 | B2 | 4/2006 | Dell et al. | 370/388 |
| 7,023,857 | B1 | 4/2006 | Chiussi et al. | 370/395.4 |
| 7,072,345 | B2 | 7/2006 | Siu et al. | 370/395.4 |
| 7,106,699 | B2 | 9/2006 | Barri | 370/235 |
| 7,139,271 | B1 | 11/2006 | Parruck et al. | 370/392 |
| 7,158,528 | B2 | 1/2007 | Dell et al. | 370/416 |
| 2001/0007562 | A1 * | 7/2001 | Matsuoka et al. | 370/415 |
| 2002/0012340 | A1 | 1/2002 | Kalkunte et al. | 370/360 |
| 2002/0012341 | A1 | 1/2002 | Battle et al. | 370/378 |
| 2002/0080796 | A1 * | 6/2002 | Matsuoka et al. | 370/395.4 |
| 2002/0131413 | A1 | 9/2002 | Tsao et al. | 370/392 |

OTHER PUBLICATIONS

C. Clos, "A Study of Non-Blocking Switching Networks", Bell System Technical Journal, Mar. 1953, vol. 32, No. 3, pp. 406-424.

M. Shreedhar and G. Varghese, "Efficient Fair Queuing Using Deficit Round Robin," in Proceedings of ACM SIGCOMM'95, pp. 231-242 (1995).

Adiseshu, Hari, et al., "Reliable FIFO Load Balancing over Multiple FIFO Channels," WUCS-95-11, May 3, 1995, pp. 1-24.

Juniper Networks, Inc., "Supporting Differentiated Service Classes: Queue Scheduling Discipline," 2001, pp. 1-27.

Office Action in U.S. Appl. No. 10/269,928, filed Oct. 11, 2002 dated Nov. 14, 2006.

Office Action in U.S. Appl. No. 10/269,928, filed Oct. 11, 2002 dated Jul. 18, 2007.

Office Action in U.S. Appl. No. 10/269,928, filed Oct. 11, 2002 dated Dec. 28, 2007.

Office Action in U.S. Appl. No. 10/269,928, filed Oct. 11, 2002 dated Jul. 17, 2008.

Office Action in U.S. Appl. No. 10/269,928, filed Oct. 11, 2002 dated Jan. 6, 2009.

Office Action in U.S. Appl. No. 10/270,264, filed Oct. 11, 2002 dated Nov. 21, 2006.

Office Action in U.S. Appl. No. 10/270,264, filed Oct. 11, 2002 dated Jun. 15, 2007.

Office Action in U.S. Appl. No. 10/358,678, filed Feb. 5, 2003 dated Jun. 26, 2007.

Office Action in U.S. Appl. No. 10/358,678, filed Feb. 5, 2003 dated Jan. 15, 2008.

Office Action in U.S. Appl. No. 10/358,678, filed Feb. 5, 2003 dated Mar. 27, 2008.

Notice of Allowance U.S. Appl. No. 10/269,928, filed Oct. 11, 2002 dated May 18, 2009.

Notice of Allowance in U.S. Appl. No. 10/270,264, filed Oct. 11, 2002 dated Sep. 4, 2007.

Notice of Allowance in U.S. Appl. No. 10/358,678, filed Feb. 5, 2003 dated May 15, 2008.

Notice of Allowance in U.S. Appl. No. 11/738,561, filed Apr. 23, 2007 dated Oct. 1, 2008.

* cited by examiner

BACKPRESSURE MECHANISM FOR SWITCHING FABRIC

CROSS-REFERENCES

This application is a continuation of U.S. patent application Ser. No. 10/358,678, filed on 02/05/03, which itself claims the benefit of U.S. Provisional Application No. 60/362,144, filed Mar. 6, 2002, both of which are incorporated herein by reference in their entirety.

BACKGROUND

1. Field of the Invention

The invention relates to switching fabrics, and more particularly to a flow control method and apparatus for fairly allocating the bandwidth capacity of the fabric to multiple input flows.

2. References

The following U.S. patents are incorporated herein by reference in their entirety: U.S. Pat. Nos. 6,388,992; 5,903,735; 5,280,470; 5,930,234; and 5,455,826.

3. Description of Related Art

A switch fabric for a data network is a device that allows data from any of several input ports to be communicated switchably to any of several output ports. Early data networks were based on circuit switching, in which fixed routes were established through the fabric for each session. The peak bandwidth demand of each session was allocated to the route for the entire duration of the session. When session traffic was bursty, however, circuit switching resulted in under-utilization of network resources during the time between bursts. Packet switching was developed to overcome this disadvantage, thus improving the network utilization for bursty traffic.

Packet switched networks dynamically allocate bandwidth according to demand. By segmenting the input flow of information into units called "packets," and processing each packet as a self-contained unit, packet switched networks allow scheduling of network resources on a per-packet basis. This enables multiple sessions to share the fabric resources dynamically by allowing their packets to be interleaved across the fabric. Typically each packet includes a header indicating its destination port, and the fabric includes a routing mechanism for determining a route through the fabric, on a per-packet basis.

Small switching fabrics can be constructed from crossbar switches, in which a scheduler configures the crossbar in a each time slot to connect a set of input ports to set of output ports in a one to one mapping (or one to many in the multicast case). The crossbar scheduler decides what the mapping between inputs and outputs should be in a particular time slot. Both input port constraints and output port constraints are taken into account by the scheduler: input ports contending for the same output port share the bandwidth of that output port in some manner that the crossbar scheduling algorithm considers fair, and output port usage is optimized by attempting to have every output port carry a cell in each time slot for which any input port has a cell destined for that output port.

Crossbar scheduling algorithms are often designed to mimic maximally weighted matching, a discipline that tries to maximize a particular objective function in each time slot by making more of an effort to grant requests from inputs which have longer queues. The strict maximally weighted matching discipline is a very hard problem, though, so crossbar scheduling algorithms have been devised that only approximate maximally weighted matching. In one such crossbar scheduling algorithm, known as ISLIP, inputs keep virtual output queues (VOQs) in which cells bound for different output ports wait at the inputs for transfer. Before each time slot begins, each input submits to a central scheduler or arbiter a request to connect with a certain output. Part of the ISLIP algorithm is a procedure for the input to decide which output to request being connected to, among all of the outputs that the input has cells to send to. The central scheduler collects all of the requests, and chooses which to grant. There can be several rounds of requests and grants so that an input that did not get its first request granted can submit a request for connection to a different output to which it has data to send.

It can be seen that a crossbar scheduler needs to be centralized, both in the sense that it needs to coordinate the functioning of all input ports and in the sense that it needs to coordinate the functioning of all output ports. It needs to coordinate all the input ports because it needs to ensure that no more than one input port is transmitting a cell to the same output port in the same time slot; crossbar fabrics (at least pure ones) cannot tolerate such a situation. It needs to coordinate all output ports in order to maximize utilization of the bandwidth capacity of each one. In short, a crossbar scheduler needs to be aware of the global state of the overall system in each time slot in order to do its job well.

The centralized nature of crossbar schedulers tends to prevent the scaling of crossbar switching fabrics to large numbers of inputs and outputs. At least two factors limit the scalability of crossbar switching fabrics. First, as the number of input and output ports grow, and channel data rates increase, it becomes increasingly difficult to design logic circuitry that is fast enough to make all the required calculations in time for each time slot. Since the crossbar scheduler must be centrally implemented, its complexity usually increases more than linearly with the number of input and output ports that the algorithm is required to handle. Second, as the number of input and output ports grows, per-chip or per-module pin count limitations begin to require the spreading of the fabric over more than one chip or module. In this case it also becomes increasingly difficult to design in sufficient control signal capacity to transmit the requests and grants between the centralized scheduler and all the various inputs.

As the need for larger and larger switching fabrics increases, therefore, it becomes more and more important to find a mechanism for controlling the transmission of data packets from switch inputs to switch outputs, in a manner that scales much more easily to larger fabrics.

SUMMARY OF THE INVENTION

In an aspect of the invention, roughly described, the packet scheduling problem is simplified enormously by removing the requirement that the scheduling algorithm coordinate among all the input ports, and removing the requirement that it consider the constraints of any of the output ports. Instead, the input queues are divided into small groups (each group perhaps located on a different input module), and a separate, independent queue scheduler is provided to serve each group. Each queue scheduler can be ignorant of the decisions being made by other schedulers responsible for serving other input queues, because the problem of more than one uncoordinated input sending a packet to the same output port is handled by including a memory between the inputs and each given output that has enough writing bandwidth to be able to accept packets from all the input port schedulers at the same time. In one embodiment, a multistage switching fabric is used instead of a crossbar fabric. In another embodiment, a single stage switching fabric is used with sufficiently fast internal memory. By removing the requirement that the scheduler responsible for one group of input queues coordinate with the schedulers responsible for all other groups of input queues, the requirement for control signaling among the input ports also can be removed. Thus as the system grows to accommodate more input ports, the packet transmission control mechanism need not increase significantly in complexity. Instead, the function can be divided among more queue schedulers, each no more complex than the basic queue scheduler. And when the system grows to the point of requiring input ports to be distributed among a number of input modules, the packet transmission control function no longer restricts this growth because the queue schedulers, too, can be distributed among the same number of input modules without incurring additional costs for communicating control signaling among the input ports.

Each queue scheduler is also ignorant of the instantaneous state of the output ports; the scheduler makes its decisions based only (with one exception) on the local state of its input queues. Output port control is handled by a separate set of flow monitors and supervisors which police output port bandwidth utilization by each of the individual input threads and assert backpressure toward the input port queue scheduler that is responsible for scheduling packets for any thread that is exceeding its bandwidth allocation. The one exception above with respect to the local nature of the factors on which a queue scheduler makes its decisions, is that the queue scheduling algorithm is modified to the extent that input queues for which backpressure is asserted are ineligible for scheduling. By policing output port usage and controlling bandwidth allocations through backpressure (or other feedback) rather than affirmatively considering all output port states in each scheduling decision, the need for control signaling between the output ports and the schedulers, too, is vastly reduced. In addition, the policing can occur on a much slower time scale than the per-time-slot output port utilization coordination used by conventional crossbar schedulers, thereby reducing the control signaling even further.

Accordingly, the aspects of the invention described above nearly eliminate the centralized scheduler as a bottleneck on the growth of packet-based switching fabrics to accommodate greater numbers of input and output ports.

The use of a multistage fabric for packet-based switching may be counterintuitive because in the past, such fabrics have been used mostly for circuit-based switching applications. In a multistage switching fabric, data transmission from a number of input ports to a number of output ports is accomplished through one or more intermediate stages. Each stage can have one or more module, each implementing its own internal switch. In addition, in a fully connected network, all of the modules in each stage of the network have respective communication paths to all of the modules in the next stage. A basic network of this sort has three stages (input, intermediate and output), but networks with any odd number of stages theoretically can be constructed by replacing the modules in any given stage with smaller multi-stage networks in recursive fashion.

A special case of multi-stage switch networks was studied by Clos in C. Clos, "A Study of Non-Blocking Switching Networks", Bell System Technical Journal, March 1953, vol. 32, No. 3, pp. 406-424, incorporated by reference herein. A so-called Clos network has three stages, any of which can be recursed to create effectively a network with a larger odd number of stages. All input stage modules (sometimes simply called "input modules") of the network have an equal number of input ports, all output stage modules (sometimes simply called "output modules") have an equal number of output ports, and all input and output modules are fully interconnected with all intermediate stage modules (sometimes simply called "intermediate modules"). Clos networks can be symmetric, in which case the number of modules and the number of ports per module on the input side match the corresponding values on the output side, or they can be asymmetric, in which case the number of modules or the number of ports per module on the input side do not necessarily match the corresponding values for the output side. A symmetric Clos network, therefore, can be characterized by a triple (m,n,r) where m is the number of modules in the intermediate stage, n is the number of input ports on each input module (the same as the number of output ports on each output module), and r is the number of modules in the input stage (the same as the number of modules in the output stage). An asymmetric Clos network must be characterized by a quintuple (m, $n_i$, $r_i$, $n_o$, $r_o$).

Multistage topologies naturally lend themselves to distributed implementations, but until now it was not apparent how such a fabric could be adapted for use in a packet-based switch. It is much easier to control dataflow through such a switch in a circuit switched environment (where routing changes occur on the order of seconds, minutes, hours or longer) than in a packet switched environment (where routing changes occur on the order of milliseconds or microseconds or shorter). In particular, any attempt to use known crossbar scheduling algorithms to control the packet data transmission across a multistage fabric would quickly stifle scalability for the reasons mentioned above. As described above, aspects of the invention overcome that problem.

As mentioned above, in an aspect of the invention, a data packet transmission across the switching fabric preferably is controlled by a modified queue scheduling algorithm. A queue scheduling algorithm attempts to allocate a resource fairly among a number of input queues contending for that resource. In the typical case of a router, the resource is an output port of the router. In the present case the resource is the switching bandwidth capacity of a multistage switch. Queue scheduling algorithms differ from crossbar scheduling algorithms in that whereas crossbar scheduling algorithms choose an input port to be connected to each output port in each time slot, queue scheduling algorithms (as used in a multistage switching fabric) choose among non-empty input queues for transmission into the next stage of the fabric. A queue scheduling algorithm need consider only the state of the input queues that it controls, not the state of any fabric output port be serviced in each time slot. The output port state is taken into account only by modifying the queue scheduling algorithm to render backpressured input queues ineligible for scheduling.

As with crossbar scheduling algorithms, a number of different kinds of queue scheduling algorithms have been developed. In one algorithm, known as FIFO (first-in-first-out), packets are allocated access to the shared resource in the same order in which they are received. In another, known as priority queuing (PQ), incoming data packets are first classified into one of a number of predefined classes, and then placed in a queue specific to that class. The classes have a predefined priority order, and the queuing algorithm schedules packets from the head of one queue only when all higher-priority queues are empty. Yet another algorithm, known as fair queuing (FQ), incoming packets are placed in class-specific queues as in the priority queuing algorithm, but then the queues are serviced in round-robin order. A refinement on FQ, known as weighted fair queuing (WFQ), accommodates variable-length packets and assignment of different percentages of the bandwidth capacity of the shared resource to different ones of the input queues. In yet another algorithm, known as weighted round robin (WRR) queuing, or class-based queuing (CBQ), each class is pre-assigned a percentage of the bandwidth capacity of the shared resource. Incoming packets are placed in class-specific queues and serviced in round-robin order, except that queues that were assigned a larger percentage of the bandwidth are allowed to send a greater number of packets in each round. But since WRR does not allocate bandwidth as desired when the packet size is variable, yet another algorithm, Deficit Round Robin (DRR) queuing has been developed. According to the DRR algorithm, a deficit count is maintained for each input queue. Before packets are scheduled from a current input queue, a quantum is added to the deficit count for that queue. If the input queues are assigned different bandwidths, then the quantum for each input queue can be proportional to the relative bandwidth assigned to that queue (Deficit Weighted Round Robin—DWRR). Then, if the length of the packet is smaller than the deficit count for the input queue, the packet is selected from the current input queue and the deficit counter for that input queue is reduced by the length of the packet. The scheduler continues selecting packets from the same input queue, concomitantly reducing the deficit count for that queue, until the length of the next packet at the head of the queue is greater than the deficit count for the current queue. The scheduler then moves on to the next input queue in round robin sequence, adds the quantum to the deficit count for the new queue, and tests the count against the length of the new packet. Many other queue scheduling algorithms exist as well, including variations on those mentioned above. Any can be used in an embodiment of the invention, with the modification that backpressured input queues are ineligible.

Accordingly, roughly described, in an aspect of the invention, a switching fabric manages per-flow bandwidth utilization of the output port bandwidth capacity through the use of a reactive policing mechanism, rather than a proactive scheduling mechanism, of the flows destined for the output port. In another aspect, the fabric includes many supervisors distributed across the fabric, rather than a single centralized scheduler. In another aspect, as described more fully hereinafter, the switching fabric is able to guarantee bandwidth capacity at a significantly finer granularity of data flows than has been feasible previously, and is also able to allocate unused bandwidth among needy flows with strict or nearly strict fairness. of In another aspect, a switching fabric uses leaky buckets to apply backpressure in response to overutilization of downstream port capacity by particular subflows. In another aspect, a switching fabric includes a cascaded backpressure scheme, in which individual flows from input modules to a given fabric output port are backpressured as a group in response to overutilization of the fabric output port by the individual flow, and individual subflows feeding a given one of such flows are backpressured individually in response to overutilization of the given flow bandwidth capacity by the individual subflow. Many other features and aspects are set forth herein and in the appended claims.

BRIEF DESCRIPTION OF THE DRAWINGS

The invention will be described with respect to specific embodiments thereof, and reference will be made to the drawings, in which.

DETAILED DESCRIPTION

Figure 1:
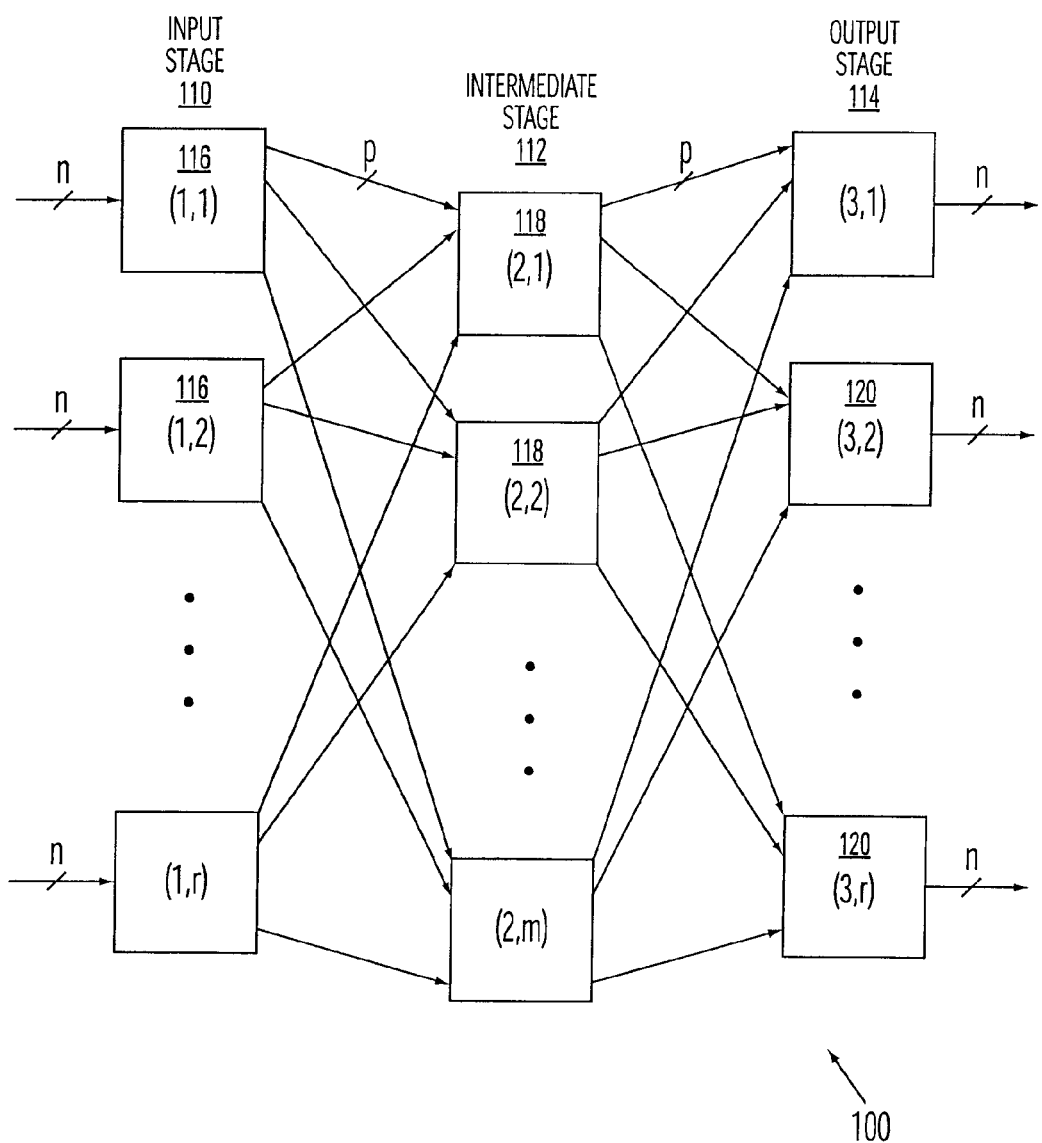
FIGS. 1, 1A, 1B, 1C, 1D, 2 and 3 are block diagrams of modular switch fabrics incorporating features of the invention.

FIG. 1 is a block diagram of a modular switch fabric 100 incorporating the invention. The fabric of FIG. 1 has three stages: an input stage 110, an intermediate stage 112 and an output stage 114. The stages are also sometimes referred to herein as the first, second and third stage, respectively. Any or all of the modules can implement its switching function internally by using a crossbar switch, one or more recursive levels of 3-stage sub-networks, or by any other structure. The input stage 110 of the fabric has r input modules 116, numbered (1,1) through (1,r). Each input module 116 has n input ports and mp output ports. The intermediate stage 112 has m modules 118, numbered (2,1) through (2, m). The number of data links from each input module 116 to each intermediate stage module 118 is p. Alternatively, a different embodiment can implement only one data link from each input module 116 to each intermediate stage module 118, but with a capacity of p times the capacity of each fabric input port. Each intermediate stage module 118 includes rp input ports and rp output ports. The output stage 114 of the fabric has r output modules 120, numbered (3,1) through (3, r). Each output module 120 has mp input ports and n output ports. Not shown in FIG. 1 are input line cards, which are upstream of the input stage 110, and output line cards, which are downstream of output stage 114. Also not shown are serializer/deserializer integrated circuits used for transporting signals across a switch backplane.

The fabric of FIG. 1 is an (m,n,r) symmetrical Clos network, but the general principles of the invention will also work with asymmetrical Clos networks, networks which are not fully interconnected, networks in which not all of the input modules have an equal number of input ports and/or not all output modules have an equal number of output ports, and so on. Clos networks are preferred, however, because their throughput properties are easier to analyze and prove theoretically. Clos networks are preferred also because they are easier to build in a modular fashion. In particular, all of the modules 116 in the input stage 110 of the fabric of FIG. 1 are identical; all of the modules 118 in the intermediate stage 112 of the fabric of FIG. 1 are identical; and all of the modules 120 in the output stage 114 of the fabric of FIG. 1 are identical.

Preferably, in fact, all of the modules in all of the stages of the fabric of FIG. 1 are fabricated from identical integrated circuit chips, sometimes referred to herein as Cashmere chips, which are designed to include all of the features required for any stage of the fabric. The chip is configured as an input module 116, an intermediate stage module 118 or an output module 120, by pin strapping or programming, depending on the stage at which the particular chip is deployed in the fabric.

Because of the modular nature of the architecture, non-blocking fabrics with various numbers of input and output ports and various topologies can be built with Cashmere integrated circuit chips. Using a companion Pashmina integrated circuit chip, several such fabrics can be connected in parallel to build fabrics with a number of quad-speed input and output ports and 1:n redundancy. Blocking architectures with a larger throughput can also be designed.

Figure 1A:
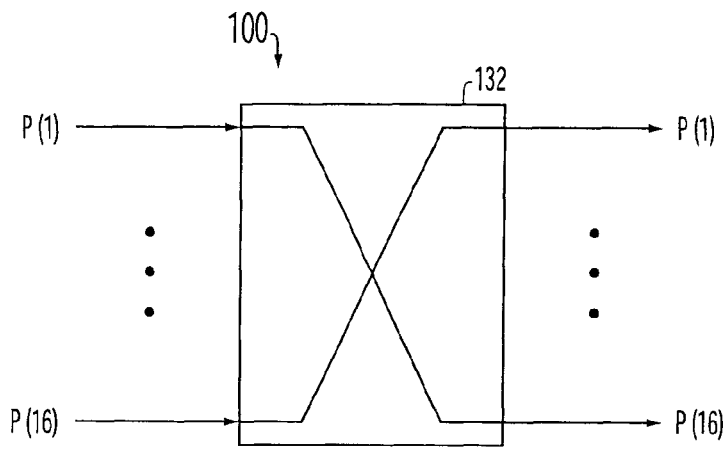

FIG. 1A, for example, shows a fabric that contains only one module 132. The module has 16 bidirectional ports, each of which is connected to a respective line card LC1-LC16 (not shown). The fabric of FIG. 1A is sometimes referred to herein as a C fabric, reflecting the fact that traffic passes through only one Cashmere integrated circuit chip. If each I/O port of the fabric supports a net data rate of 10 Gbps in each direction, then the overall fabric a FIG. 1A has a net data throughput of 160 Gbps.

Figure 1B:
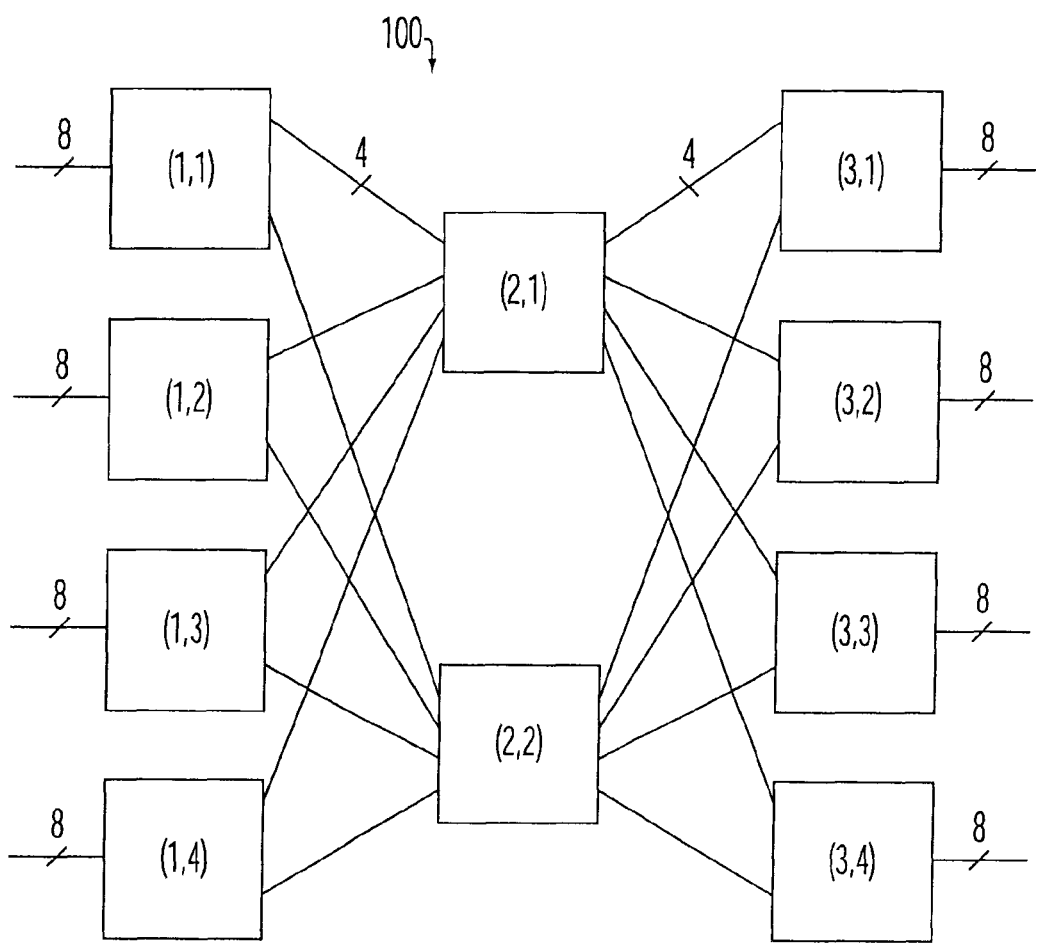

FIG. 1B illustrates a three-stage fabric made using 10 modules organized as four input modules (r=4), two intermediate stage modules (m=2) and four output modules. Each input module has eight input ports, and each output module has eight output ports (n=8). Each input module has four parallel data links to each intermediate stage module, and each intermediate stage module has four parallel data links to each output module. Traffic flow is from left to right in this and all fabric topology drawings herein, unless arrows on the data paths indicate otherwise. This topology supports up to 32 input line cards and 32 output line cards, or in a folded equivalent topology (discussed below with respect to FIG. 2), it supports 32 bidirectional line cards. If each port of the fabric supports the net data rate of 10 Gbps, then the overall fabric of FIG. 1B has a net data throughput of 320 Gbps.

Figure 1C:
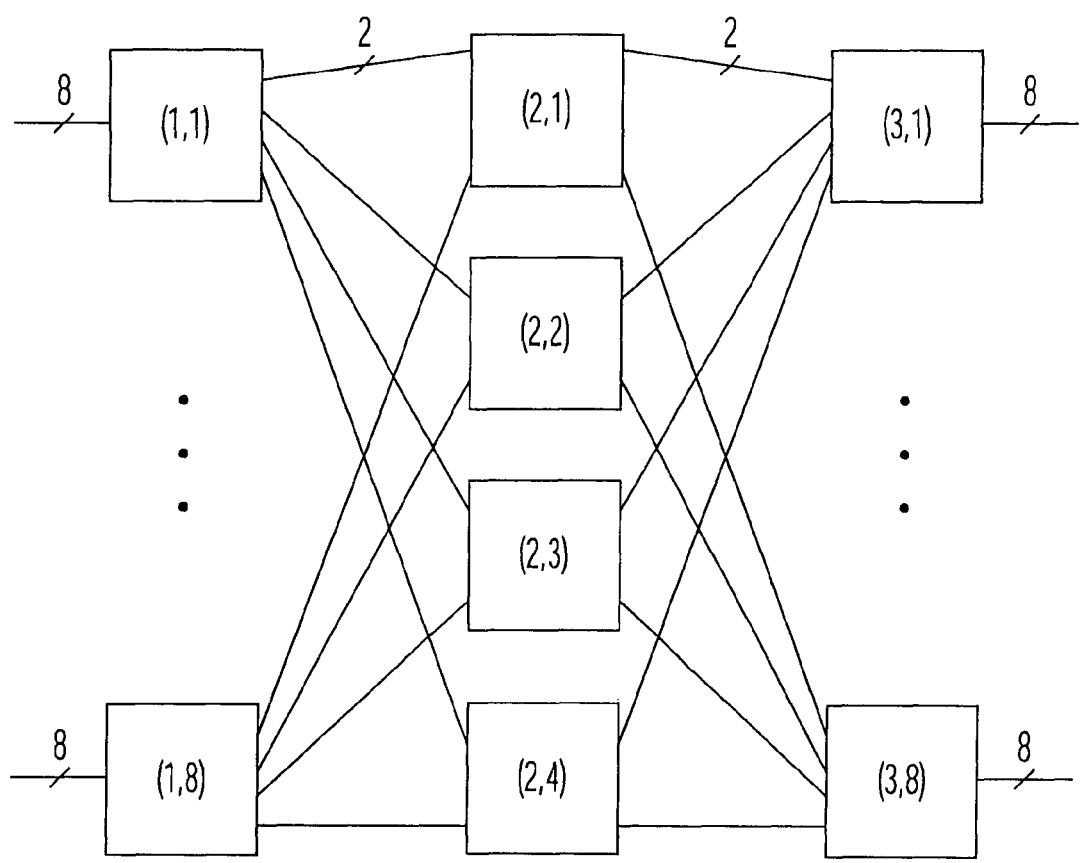

FIG. 1C illustrates yet another topology which can be formed using Cashmere modules. This topology includes eight input modules (r=8), eight output modules, and four intermediate modules (m=4). Each input module has eight input ports, and each output module has eight output ports (n=8). Each intermediate module has two data links to each of the input modules and to each of the output modules (p=2). This topology supports up to 64 input line cards and 64 output line cards, or in a folded equivalent topology, it supports 64 bidirectional line cards. If each port of the fabric supports the net data rate of 10 Gbps, then the overall fabric of FIG. 1C has a net data throughput of 640 Gbps.

Figure 1D:
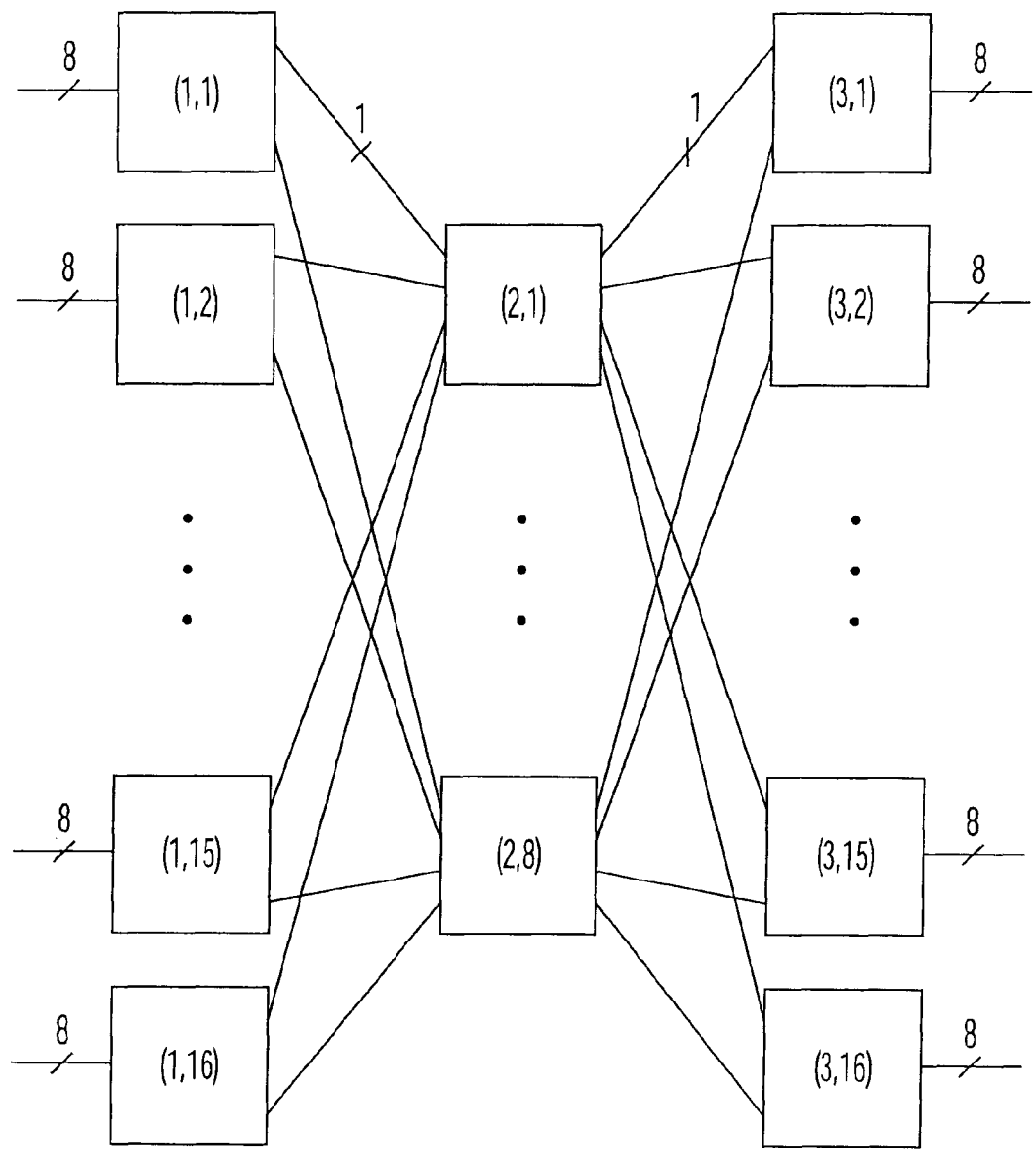

FIG. 1D illustrates still another topology which can be formed using Cashmere modules. This topology includes a 16 input modules, 16 output modules (r=16), and eight intermediate stage modules (m=8). Each input module has eight input ports, and each output module has eight output ports (n=8). Each intermediate module has only one data link to each of the input modules and to each of the output modules (p=1). This topology supports up to 128 input line cards and 128 output line cards, or in a folded equivalent topology, it supports 128 bidirectional line cards. If each port of the fabric supports the net data rate of 10 Gbps, then the overall fabric of FIG. 1D has a net data throughput of 1.28 Tbps. While all of the example topologies of FIGS. 1B-1D have r=2m, it will be understood that other ratios are possible in other embodiments.

All of these various technologies are made possible in part by the distributed nature of the flow control mechanisms described herein. Thus a manufacturer of input, intermediate and output modules according to the invention can provide input, output and intermediate stage modules for each of first and second fully interconnected multicast data switches, preferably non-blocking, wherein all of the input modules provided for both the first and second data switches are identical in the logic they contain, and wherein the number of input modules provided for the second data switch differs from the number of input modules provided for the first data switch. Furthermore, all of the intermediate stage modules provided for both the first and second data switches can be identical in the logic they contain, with the number of intermediate stage modules provided for the second data switch differing from the number of intermediate stage modules provided for the first data switch. In fact, all of modules provided for both the first and second data switches can be identical in the logic they contain.

In an embodiment, the number of input modules provided for the second data switch can be twice as large as the number of input modules provided for the first data switch. In an embodiment, the number of intermediate stage modules provided for the second data switch is twice as large as the number of intermediate stage modules provided for the first switch. In an embodiment, each of the data paths interconnecting an input stage module with an intermediate stage module has half the data rate in the second data switch than in the first data switch. The manufacturer further can provide input, output and intermediate stage modules for a third data switch, wherein all of the input modules provided for both the second and third data switches are identical in the logic they contain, all of the intermediate stage modules provided for both the second and third data switches are identical in the logic they contain, the number of input modules provided for the third data switch is twice as large as the number of input modules provided for the second data switch, the number of intermediate stage modules provided for the third data switch is twice as large as the number of intermediate stage modules provided for the second switch, and each of the data paths interconnecting an input stage module with an intermediate stage module has half the data rate in the third data switch as in the second data switch. Many other variations will be apparent.

Although the modules of FIG. 1 are in one embodiment implemented as separate integrated circuit chips, the invention does not require this. In other embodiments, two or more of the modules can exist on a single chip or single card, or one module can span multiple chips or cards. However, many benefits of the invention become more significant in embodiments incorporating multiple integrated circuit chips.

Switching fabrics according to the invention are suitable for many products, including but not limited to ethernet switches, access routers, MAN switches, server switches, core MPLS routers, and SANs. Inherent support for multicast replication greatly expands the number and kinds of applications for which the fabric can be used, thereby significantly enhancing its commercial viability. The innovative architecture results in cost, performance, and scalability characteristics that are greatly superior to those of previously known products.

The fabric of FIG. 1 transports fixed size frames, or alternatively transports variable-size frames—from a few bytes to jumbo—without losses. The fabric supports three classes of service: Time-Sensitive (TS), Bandwidth-Provisioned (BProv), and Best-Efforts (BE). It switches Time-Sensitive frames with the highest priority. In the absence of Time- Sensitive traffic, the fabric transports Bandwidth-Provisioned frames, and then Best-Efforts frames. When suitably policed by the line cards upstream of the fabric, frames are transported across the fabric with short latency. The fabric also guarantees a minimum bandwidth to the stream of Bandwidth-Provisioned frames between each input/output pair of line cards. The fabric switches Best-Effort frames with the maximum throughput possible given the topology of the fabric. In particular, the fabric of FIG. 1 can be non-blocking with an appropriate topology. That is, it can sustain any set of rates that do not saturate fabric output ports. In addition, the fabric supports multicast with the maximum possible throughput.

Incoming data belongs to one of a number of information "flows". As used herein, the term "flow" includes all kinds of information streams, as long as they are distinguishable from each other. For example, the stream of all data arriving through a single physical fabric input port can be considered an information flow, as can the stream of all data traversing the fabric from one physical fabric input port to one physical fabric output port, and the stream of all data traversing the fabric from one input module to one physical fabric output port. The stream of all the data passing through a single physical fabric output port also is considered a flow. Some flows, such as the stream of all data traversing the fabric from one physical fabric input port to one physical fabric output port, are sub-flows of other flows, such as the stream of all data traversing the fabric from one input module to one physical fabric output port. Different flows are also sometimes distinguishable by class. In some embodiments the data classes correspond to classes of service, but other embodiments can distinguish data classes according to other kinds of principles. In one particular embodiment, all incoming data is considered to be of a single data class for purpose of the flow control mechanisms, even though they might be of several classes "of service." In another embodiment, the flow control mechanisms operate separately, or in part separately, for each of several classes of service.

As used herein, "information" includes both data originating from upstream of the system as well as data originating from within the system (e.g. header and other control information). Also as used herein, the term "packet" refers to a variable size protocol data unit generated according to any protocol. A "block" of data is considered herein to refer to a packet that has a fixed length. A block, therefore, as used herein, is a special case of a packet. A "data segment", as used herein, implies nothing more than a segment of data. Thus it is generic to packets, blocks, frames, cells, and portions thereof, and any other grouping of data of any length, fixed or variable. A "frame" is a data segment being processed through the particular fabric described herein, and in particular may include both a packet as well as additional header information needed only while the packet is within the fabric. In some embodiments the header information may change as the frame progresses through the fabric.

The fabric of FIG. 1 has standard interfaces and can be attached directly to some network processors without additional interface chips. As described in more detail hereinafter, the flow control mechanisms of the fabric are distributed and implemented in the input modules 116. and the intermediate modules 118. Consequently, the fabric does not require a separate global scheduler, thereby greatly improving scalability.

Figure 2:
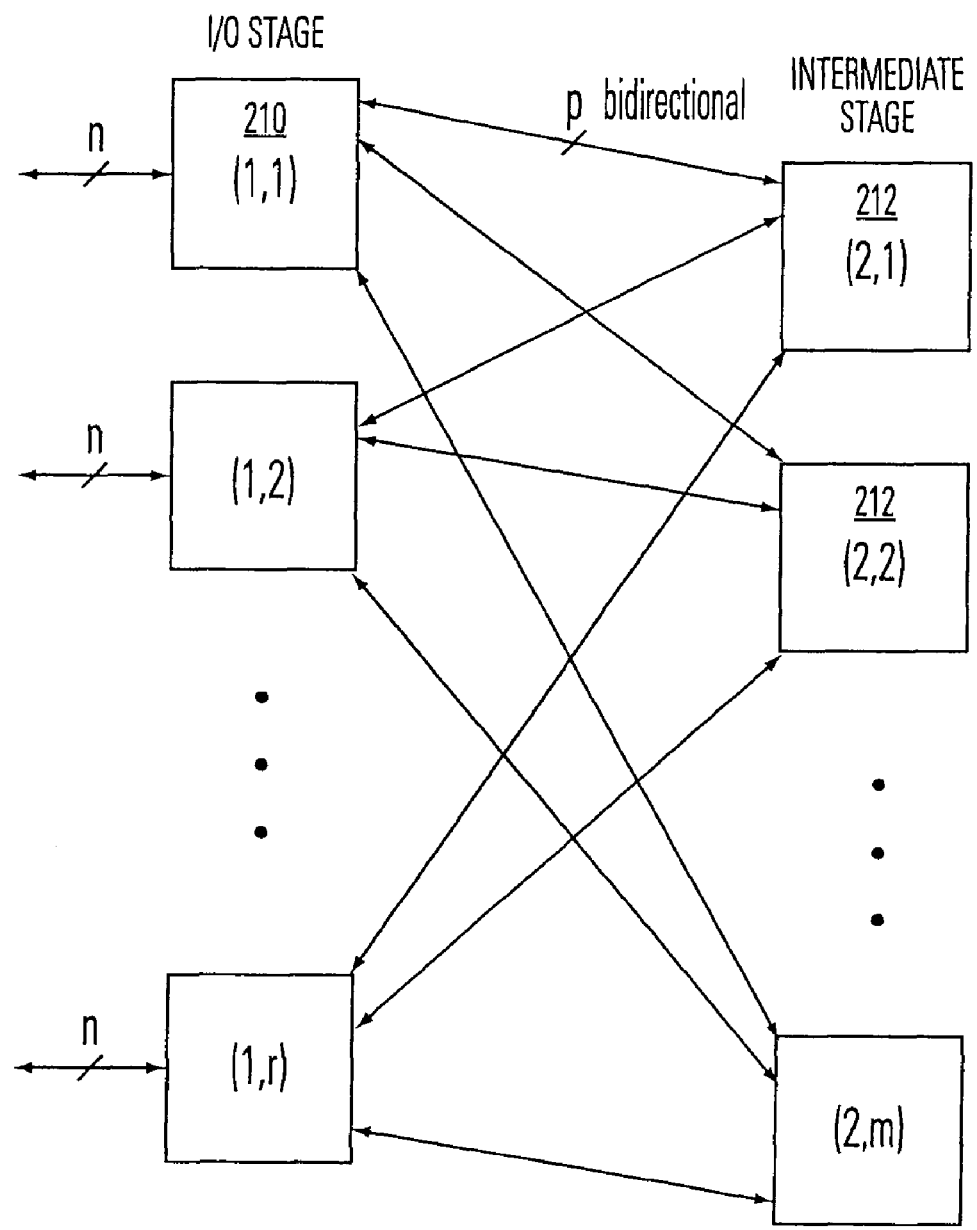

The fabric of FIG. 1 preferably can be implemented in a "folded" topology such as that shown in FIG. 2. In this topology, one input module 116 is combined onto a single chip with an output module 120 to thereby form an I/O stage module 210. Instead of separate input and output data paths to separate input and output line cards, the folded topology fabric of FIG. 2 has a bidirectional data port coupling each of the line cards to and I/O stage module 210. Similarly, the data paths between I/O stage modules 210 and intermediate stage modules 212 are bidirectional. The folded topology of FIG. 2 provides certain known advantages over the flat topology of FIG. 1, but is equivalent for purposes of the flow control algorithms. For clarity of discussion and illustration, therefore, the topology illustrated FIG. 1 will be used in the following discussions and it will be understood that the discussions could equally well apply to an equivalent folded topology.

Figure 3:
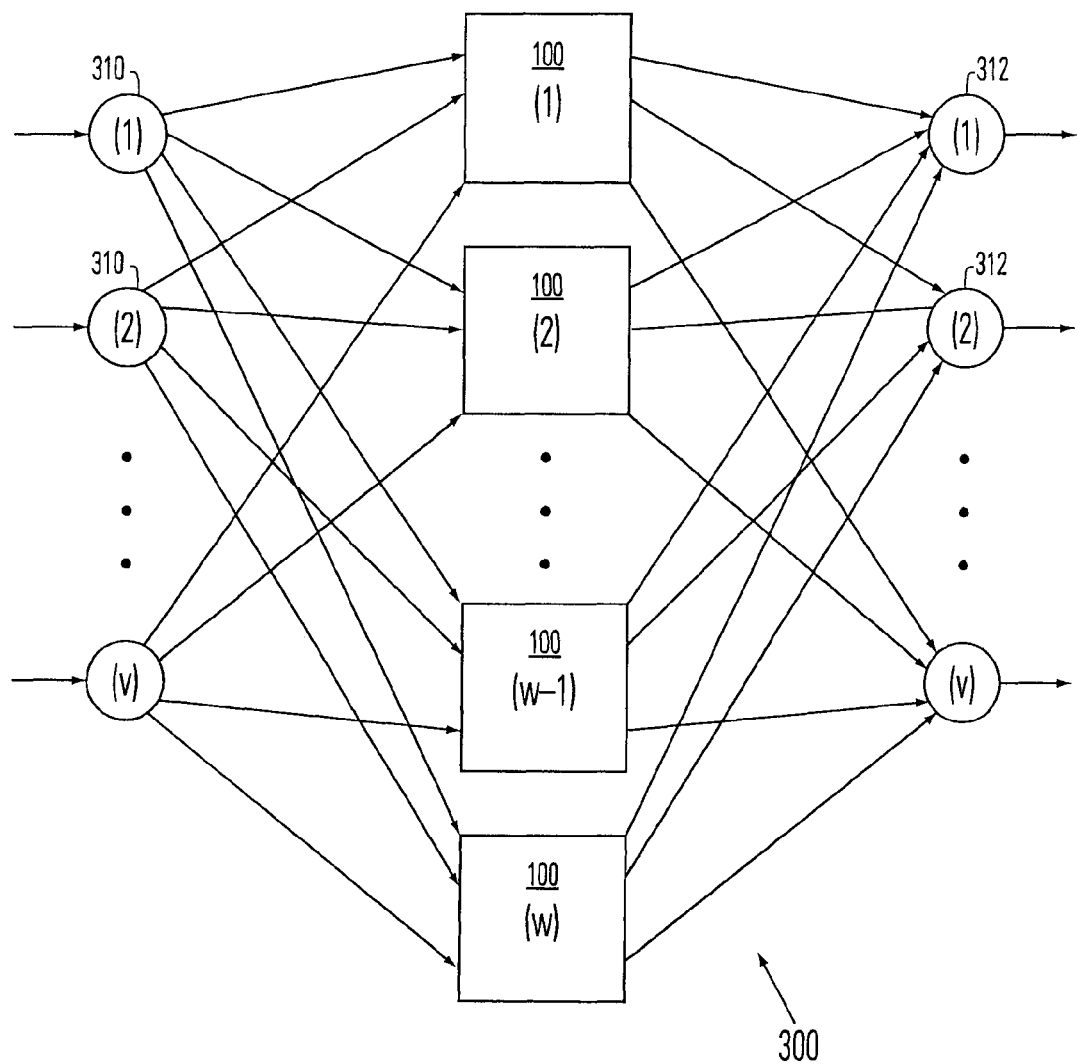

Returning to FIG. 1, this fabric is sometimes referred to herein as a CCC fabric, reflecting that data flows through three Cashmere integrated circuit chips as it progresses through the fabric. FIG. 3 illustrates another fabric architecture 300, which includes w complete CCC fabrics 100 arranged in parallel. Preferably the fabric 300 includes at least one more CCC fabric 100 than strictly necessary, to thereby provide redundancy. The CCC fabrics 100 are arranged in the topology of FIG. 3 as intermediate stage modules in the overall fabric. A corresponding folded topology is also possible. The topology of FIG. 3 also includes v input modules 310 and v output modules 312. In general the input and output modules 310 and 312 each can have multiple input and output ports connecting to multiple line cards. In the embodiment of FIG. 3, however, each of the input and output modules 310 and 312 serves only a single corresponding line card. In the embodiment of FIG. 3, the net data rate between a line card and its corresponding input or output module 310 or 312 is four times the net data rate of each of the data links between the input modules 310 and the CCC fabrics 100 or between the CCC fabrics 100 and the output modules 312. For example, if the net data rate of each of the links between input modules 310 and CCC fabrics 100 is 10 Gbps, then the net data rate between a line card (not shown) and its input module 310 might be 40 Gbps. Because each input and output module 310 and 312 serves only one line card, they can be implemented more simply than the Cashmere integrated circuit chip. In an embodiment, for a folded topology corresponding to that of FIG. 3, one input module 310 is combined with one output module 312 on a single I/O module sometimes referred to herein as a Pashmina integrated circuit chip. The overall topology of FIG. 3 is sometimes referred to herein as a PCCCP topology, because data passes through a Pashmina chip, a CCC network, and then a Pashmina chip as it progresses across the fabric.

Returning again to FIG. 1, at the ingress, the line cards mark the variable-size frames with the class of service and a routing tag that together define a "thread" or a "multicast group." A "thread" is a triplet identifying a source line card (fabric input port), a destination line card (fabric output port), and a class. The fabric also includes the concept of a "microbundle", which is a bundle of all the threads originating from a common input module. A microbundle is therefore a triplet identifying a source input module, a fabric output port, and a class. The classes in the present embodiment are distinguished by classes of service (TS, BProv or BE), but in other embodiments they can be distinguished by any mechanism desired. A "multicast group" is a group of one or more output ports to which the incoming packet is destined. In the present embodiment, for reasons that will become apparent below, all multicast flows arriving through a single input port, and having a single class of service are backpressured together as a single thread, regardless of their destination output ports. A "multicast tree" is a triple (input port, set of output ports, class). Multicast trees are provisioned into the fabric and stored in a memory so that they can be referred to in the frame header by multicast tree number. Multicast copying occurs in the intermediate stage modules 118 and in the output modules 120. In an embodiment, multicast copying is supported only for classes BP and BE, not for the TS class. In another embodiment, it is supported for all three classes. Because the fabric 100 supports multicasting, it is sometimes referred to herein as a multicasting fabric. As used herein, however, "multicast" is a capability, not a requirement. A multicasting fabric does not become a unicast fabric only because all the frames that it transports in a particular application happen to be limited to unicast frames. Nor does a multicast input flow become a unicast flow only because all of its frames happen to be destined for only one output port. The data flow is still considered herein to be a "multicast" data flow, because the system has the capability to transport the flow even if destined for more than one output port. As an example, although the present embodiment distinguishes between unicast and multicast frames and queues them separately, it will be appreciated that another embodiment might not make any such a distinction; in an embodiment of the latter kind, frames are not typed according to casting at all. All frames might identify a multicast tree, and a frame destined for only one output port might be distinguishable from a frame destined for more than one output port only by the number of output ports listed in the frame's multicast tree.

Input Stage Module

Figure 4:
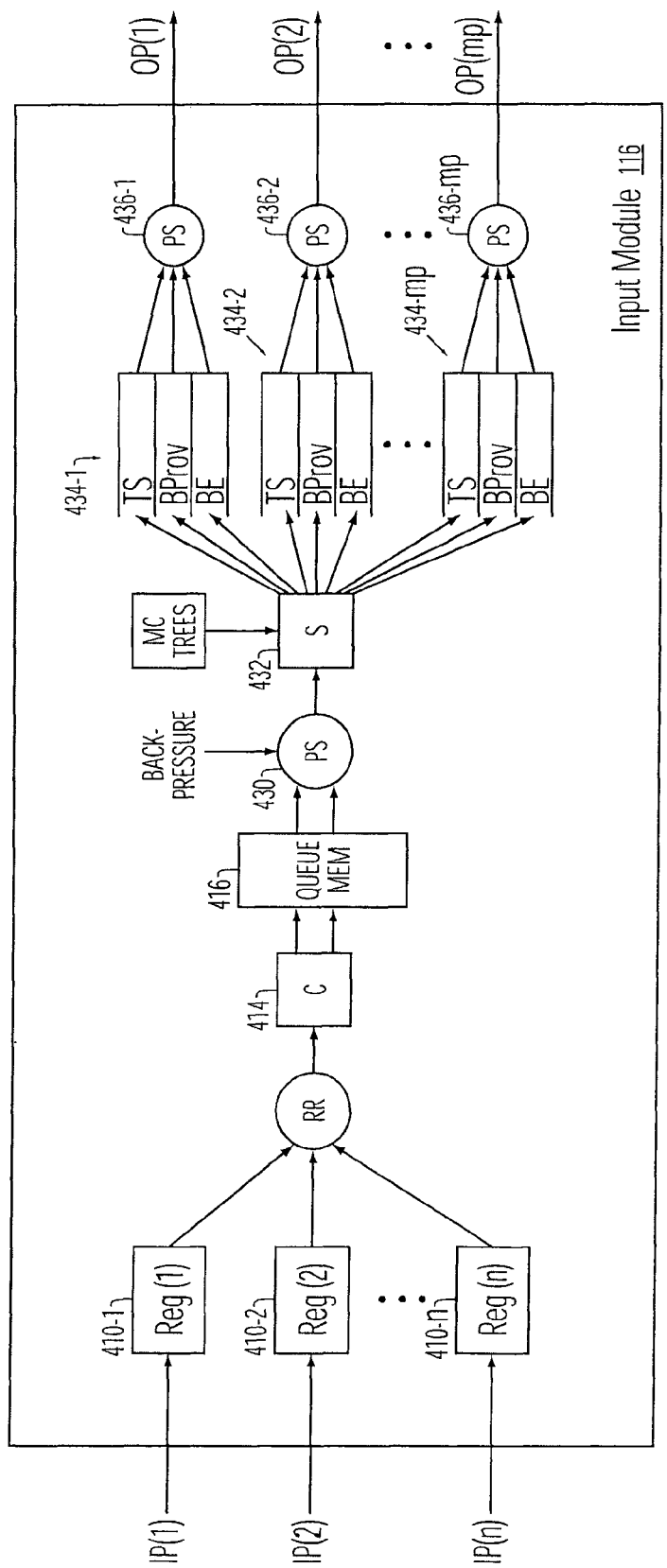
FIG. 4 is a functional block diagram of pertinent components of one of the input modules in FIG. 1.

FIG. 4 is a functional block diagram of certain data path components of one of the input modules 116. In this diagram, as well as in other functional diagrams herein, certain functional units are illustrated as being upstream or downstream from other functional units in a data path. As will be apparent, however, many of the processing elements in the diagram can be interchanged in sequence, or performed by indirect manipulation of the data path rather than as part of it. Other processing elements not shown in the diagrams also can be inserted at various points in the data path. These diagrams are intended only to illustrate functions performed, not the sequence or structure by which they are performed.

Referring to FIG. 4, variable sized frames arrived on the input ports 1-$n$ and are placed into input registers 410-1 through 410-$n$ (collectively 410). The input registers 410 are served in round-robin order, and the frames are classified in a classifier 414 and sent to one of a number of queues, all stored in a queue memory 416. The queue memory 416 maintains the following queues, for example as virtual queues stored as linked lists in the memory. In an alternative embodiment, each queue can occupy its own separate memory or its own pre-allocated region of a shared memory. In either case, preferably the queues described herein contain only descriptors of the data segments they represent. The data itself is stored in a common memory.

n time sensitive-unicast (TS-class) queues (one for each input port of the module)

n time-sensitive-multicast queues (one for each input port of the module) (in another embodiment, all TS-class flows through a given input port can be queued and backpressured together)

n×r bandwidth provisioned-Unicast (BProv-class unicast) queues (one for each fabric output port)

n bandwidth provisioned-Multicast (BProv-class multicast) queues (one for each module input port)

n×r best efforts-Unicast (BE-class unicast) queues (one for each fabric output port); and n best efforts-multicast (BE-class multicast) queues (one for each module input port).

As an example, in a fabric 100 which includes 16 input modules 116, 16 output modules 120 and 8 ports per input/output module (n=8, r=16), each input module 116 includes a total of 312 queues: 8 time sensitive-unicast queues, 8 time sensitive-multicast queues, 128 bandwidth provisioned-unicast queues, 8 bandwidth provisioned-multicast queues, 128 best efforts-unicast queues and 8 best efforts-multicast queues. The multiplicity of queues are provided to implement a fair queuing algorithm, incorporating for a scheduling among the different classes, and per-thread flow control for bandwidth provisioned class traffic and best efforts traffic. Not all queues are used in every topology.

A priority scheduler 430 chooses the next frame for striping from the input module 116, from among all the queues that are neither empty nor backpressured. The queue can be backpressured for any of several reasons, only two of which are relevant to the present discussion. These forms of backpressure are described hereinafter. The priority scheduler 430 chooses the next frame according to the following algorithm, which might be performed serially or in parallel in various embodiments, or partially serially and partially in parallel:

1. Choose a class:
   The class is chosen in priority order: TS, BProv, then BE. If any TS queue (unicast or multicast) is non-empty and non-backpressured, then the TS class is chosen. Otherwise, if any BProv queue (unicast or multicast) is non-empty and not backpressured, then the BProv class is chosen. Otherwise, if any BE queue (unicast or multicast) is non-empty and not backpressured, then the BE class is chosen. Otherwise, repeat the test in the same order until a queue is found that is non-empty and not backpressured.

2. Within the chosen class, choose a casting type (unicast/multicast):
   If the chosen class is one that supports multicasting (which is all classes in the present embodiment), then the casting type is also chosen in priority order: unicast then multicast. If any unicast queue of the chosen class is non-empty and not backpressured, then Unicast is chosen. Otherwise, Multicast is chosen. (In an alternative embodiment, the choice between unicast and multicast is made by a WRR scheduler).

3. Within the chosen class and casting type, choose an individual queue using DRR scheduling. In another embodiment, the individual queue choice can be made using DWRR scheduling.

Once the priority scheduler 430 determines the queue from which to take the next frame, a striper 432 uses a striping algorithm to determine along which of the mp possible routes through the fabric to send the chosen frame. Roughly described, the striping algorithm selects a route on which to transmit each next data segment, in dependence upon relative channel loading so far, taking account of multicast. Each input module keeps a channel loading history for each route it has, and updates its history for each route that a data segment follows through the fabric. In an embodiment, the input module transmits each data segment toward an i'th intermediate stage module, where i minimizes $$q(i,a(G),c)+q(i,b(G),c)+\ldots+q(i,k(G),c),$$

where $q(i, j, c)$ indicates the number of bytes of data sent, during a given prior time period, from the input module to each j'th one of the output modules via each i'th one of the intermediate stage modules, and $a(G), b(G), \ldots,$ and $k(G)$ are the output module(s) in the multicast group G to which the data segment is destined.

The input module then places the frame that is at the head of the queue chosen by the priority scheduler 430, into the input module 116 transmit port queue 434-1 . . . 434-*mp* (collectively 434) for the route chosen by the striper 432. Each output port of the input module 116 has associated therewith three transmit queues, one per class of service. In one embodiment, all of the transmit queues 434 share a common memory, with the data being stored in a linked list manner as in the input module 116. In another embodiment, bandwidth limitations require each of the transmit queues to be allocated a separate memory or separate region of memory. The transmit queues 434 preferably store only descriptors of the data segments to be transmitted. The data itself remains in queue memory 416 until all required copies of the data segment have been read out the output ports.

The transmit queues 434 are provided because once the striper identifies the next packet to send out on a given output port, the module might not be able to transmit the selected packet immediately. For example, it is possible for the striper 432 to stripe two consecutive packets to the same transmit port. In this case the transmit queue for that output port will hold the second packet until the first packet leaves. If instead the striper were to hold the second packet back, by pausing the striping operation, other transmit ports may go idle. So the striper continues selecting next packets and placing their descriptors into the appropriate transmit queues until there are a few packets in each transmit queue, or more accurately, until one of the transmit queues reach a threshold depth. If the striping algorithm is balancing well, then the other transmit queues should have a similar depth as the longest transmit queue. The striper resumes selecting next packets when the transmit queues fall below a lower threshold.

Once an output port is ready to transmit a packet whose descriptor has been placed in the associated transmit queue 434, a priority scheduler 436-1 . . . 436-*mp* (collectively 436) associated with the output port selects the next packet to transmit on its associated output port, from among the three class-of-service-based transmit queues 434 associated with that output port, in strict priority order. That is, if the time sensitive queue associated with the output port is non-empty, then the priority scheduler selects the head packet in the time sensitive queue. If not, and if the bandwidth provisioned queue associated with the output port is non-empty, then the priority scheduler selects the head packet in the bandwidth provisioned queue. Only if both the time sensitive queue nor the bandwidth provisioned queue associated with the output port are empty, will the priority scheduler selects the head packet in the best efforts queue associated with the output port. This queue scheduling algorithm (as well as others mentioned herein) can of course be different in a different embodiment.

Once the transmission of packet data out the output port begins, with one exception, the transmission continues until the frame is completed. The exception occurs if a TS frame becomes available in the same transmit queue 434 that is already transmitting a bandwidth provisioned frame or a best efforts frame. A TS frame can interrupt a BProv or BE frame, on a block boundary, after only part of it has been sent. The interruption of a frame does not affect operation of the striping algorithm because all frames represented in the particular transmit queue 434, regardless of class of service, are already destined for the same route.

Intermediate Stage Module

Figure 5:
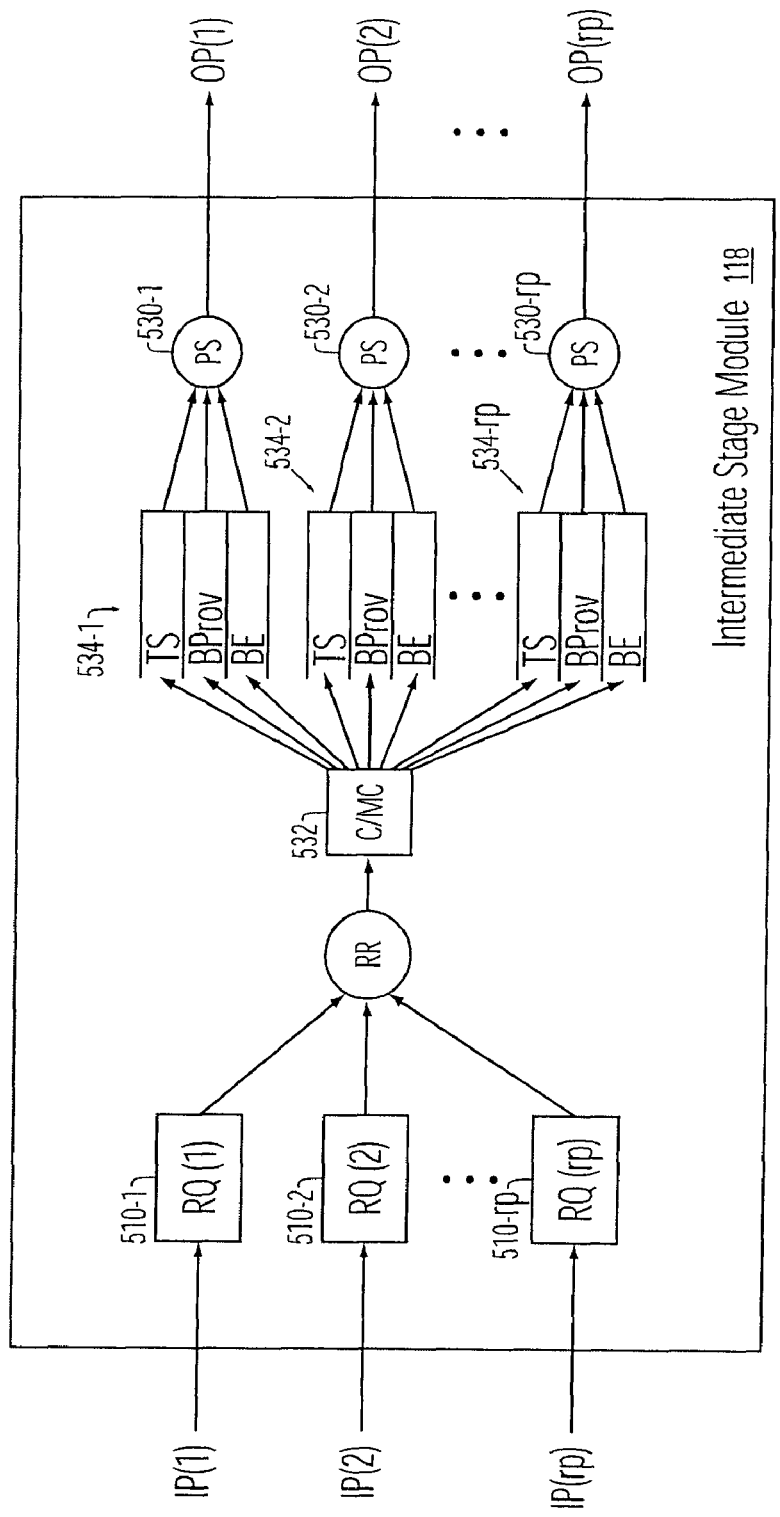
FIG. 5 is a functional block diagram of pertinent components of one of the intermediate stage modules in FIG. 1.

FIG. 5 is a functional block diagram of certain data path components of one of the intermediate stage modules 118. Frames arrive to the intermediate stage module 118 on the input ports 1-*rp* and are placed into receive queues 510-1 through 510-*rp* (collectively 510). As mentioned, in topologies in where p>1, several of the input ports are connected to the output ports of a single one of the input modules 116. The receive queues 510 are served in round-robin order, and the frames are classified and forwarded by a classifier and multicast copier 532 to the appropriate one or ones of a bank of transmit queues 534-1 . . . 534-*rp* (collectively 534). Each output port of the intermediate stage module 118 has associated therewith three transmit queues, one per class of service. In one embodiment, all of the transmit queues 534 share a common memory, with the data being stored in a linked list manner. In the present embodiment, however, bandwidth limitations require each of the transmit queues 534 to be allocated a separate memory or separate region of memory. Also, the transmit queues 534 preferably store only descriptors of the data segments, with the data segments themselves being held in a common memory. Thus the intermediate stage module 118 contains rp time sensitive transmit queues, rp bandwidth provisioned transmit queues, and rp best efforts transmit queues, for a total of 3rp separate data queues. It will be appreciated that since the integrated circuit chip is designed for use in a wide variety of topologies, a given topology might not utilize all rp input ports or rp output ports. The full quantity of rp input ports and rp output ports nevertheless exist in the module so as to be available for topologies that do require them.

The intermediate stage module 118 also includes priority schedulers 530-1 . . . 530-*rp* (collectively 530), one for each of the output ports of the intermediate stage module 118. As with the per-port priority schedulers 436 in the input module 116, each priority scheduler 530 selects the next packet to transmit on its associated output port, from among the three transmit queues 534 associated with that output port, in strict priority order.

No sophisticated striper is needed in the intermediate stage module 118, because no complex routing choices exist in the intermediate stage. By the time a frame reaches the intermediate stage 112, there is only one route to the frame's destination output port (to each of the frame's destination output ports, in the case of multicast): via the output port connected to the particular output module 120 that contains the desired output port. The intermediate stage module 118 does include a striper (not shown), but it is very simple and comes into play only in topologies that include more than one data link from an input module to an intermediate stage module and from an intermediate stage module to an output module (p>1). In particular, a one-to-one correspondence is made between data links incoming to the intermediate stage module 118 and data links outgoing from the intermediate stage module 118. The striper in the intermediate stage module then always sends a frame out the outgoing data link that corresponds to the data link on which it was received from an input module.

Output Stage Module

Figure 6:
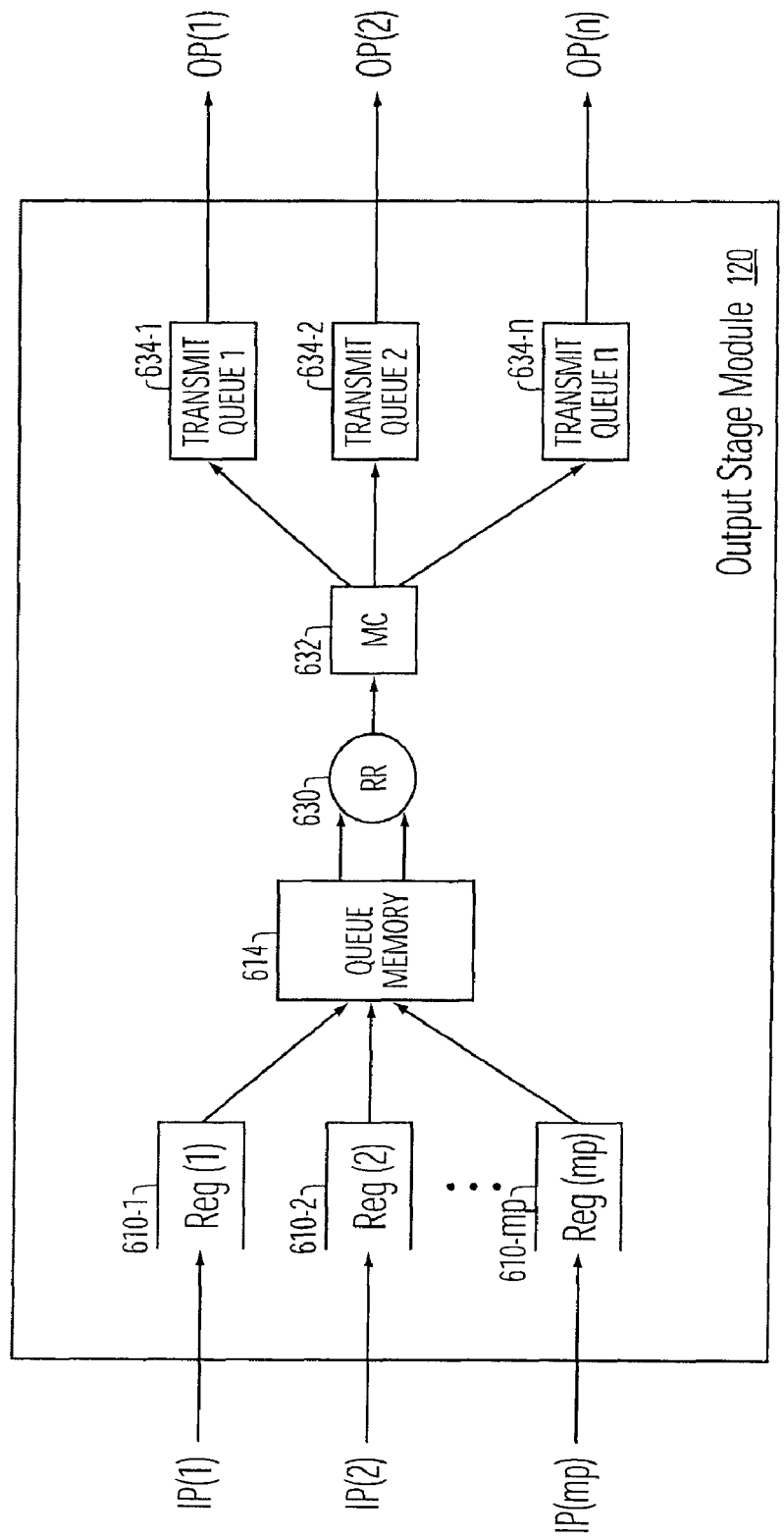
FIG. 6 is a functional block diagram of pertinent components of one of the output modules in FIG. 1.

FIG. 6 is a functional block diagram of pertinent components of one of the output modules 120. As with the input stage modules 116, frames arrive to the output module 120 on input ports (1-*mp*) and are placed into input registers 610-1 through 610-*mp* (collectively 610). In topologies where p>1, several of the input ports are connected to output ports of a single one of the intermediate stage modules 118. The input registers 610 are served in round-robin order, and the frames are re-ordered as necessary into queue memory 614. Any appropriate re-ordering algorithm can be used; its details are unimportant for an understanding of the present invention.

The output module 120 also includes a round robin scheduler 630 which selects each next frame in a round robin fashion from among all the eligible queues in queue memory

614. Once the next frame is chosen, a multicast copier 632 performs any multicast copying required by the frame and copies the frame out into the appropriate one or ones of the n transmit queues 634-1 through 634-*n* (collectively 634) for transmitting on the modules output ports. Like the input module 116 and the intermediate stage module 118, the transmit queues 634 in the output module 120 is divided by class of service and is followed by a per-port priority scheduler (not shown in FIG. 6).

Generalized Concepts for Backpressure Mechanism

The switching fabrics described herein simulate a complex scheduling of fabric input flows to each fabric output port in a distributed manner by using a reactive backpressure mechanism rather than a proactive centralized scheduler. Various embodiments can be adapted to simulate any desired queue scheduling discipline. The backpressure mechanism is used not only in response to downstream congestion, but also to enforce bandwidth availability guarantees and fair distribution of unused capacity, to a granularity as fine as individual threads. In addition, in order to minimize the effects of packet latencies across the fabric, the simulation is performed based on traffic patterns observed as close to the input modules as possible. In this way the local schedulers in the input modules can adjust traffic bandwidth utilization not based on the then-current queue levels in the destination output queues, but predictively based on the queue levels by the time that packets now being transmitted into the network will reach the output queues. The same result can be accomplished by a large, centralized scheduler, but as previously explained, that solution does not scale well to larger switching networks. The fabrics described herein implement what is essentially a distributed scheduler, really more of a distributed policer.

Figure 7:
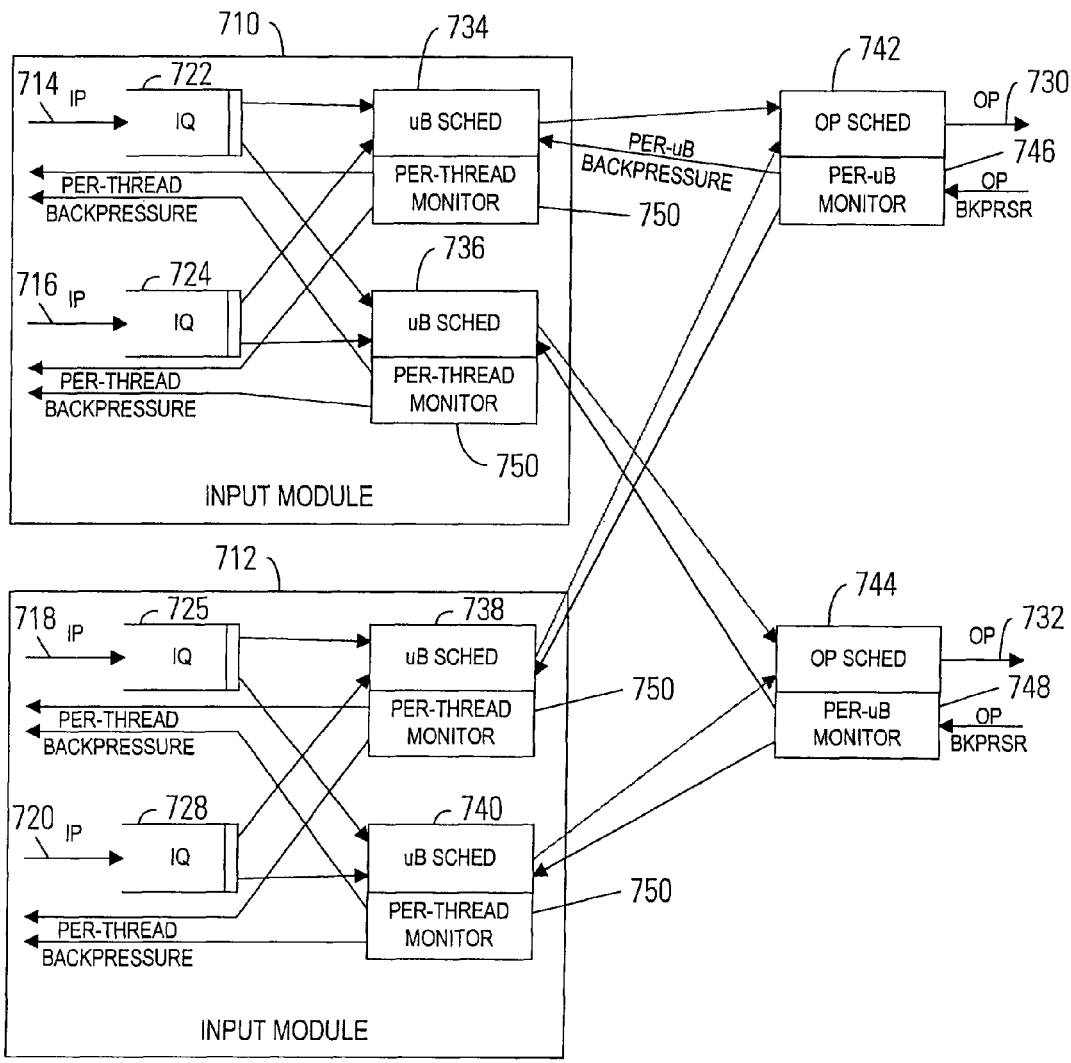
FIG. 7 is a functional block diagram of a simplified switching fabric.

FIG. 7 is a functional block diagram of a simplified switching fabric for illustrating generally how the flow control mechanism operates. In this fabric there are four input ports 714, 716, 718 and 720 distributed two per input module 710 and 712, and two fabric output ports 730 and 732. All information flows are of a single class in this simplified illustration, so data packets arriving at each of the input ports can be placed into respective input queues 722, 724, 725, and 728 without further classification. In a given one of the input modules, say module 710, all of the input flows destined for a given one of the output ports, say output port 730, are merged together by a microbundle scheduler 734 and forwarded across the fabric toward the output port 730. Similarly, microbundle scheduler 736 merges all of the input flows in the module 710 destined for output port 732 and forwards them across the fabric towards output port 732. Microbundle scheduler 738 merges all of the input flows in the module 712 destined for output port 730 and forwards them across the fabric towards output port 730, and microbundle scheduler 740 merges all of the input flows in the input module 712 destined for output port 732 and forwards them across the fabric towards output port 732. Both of the microbundles destined for output port 730 are merged together by an output port scheduler 742 for forwarding through the output port 730. Similarly, both of the microbundles destined for output port 732 are merged together by an output port scheduler 744 for forwarding through the output port 732. The intermediate stage or stages of the switching fabric are not shown in FIG. 7. In general, however, it will be appreciated that each of the microbundle flows from an input module to an output port traverses a plurality of data paths, and in fact typically the various packets of each microbundle dataflow are distributed among the various data paths of the fabric in accordance with a striping algorithm.

The output port schedulers 742 and 744 need not be very complex, since the desired allocation of bandwidth is enforced by the backpressure mechanism rather than by the scheduler. As previously mentioned, the output port schedulers 742 and 744 merely implement class-based priority scheduling. However, each output port also has associated with it a per-microbundle flow monitor 746 or 748, which monitors the actual bandwidth usage of the output port capacity and asserts backpressure against any microbundle flow which is overutilizing its allocation. The microbundle schedulers 734 and 738 in the input modules temporarily withhold further packet transmissions into any microbundle which is backpressured, until backpressure is negated.

The per-microbundle monitors 746 and 748 are illustrated in FIG. 7 as being separate units, each associated with a respective single output port 730 or 732. In another embodiment, a single unit can be implemented which monitors bandwidth usage through several output ports, for example all of the output ports in a single output module. Such a combination monitor may be able to conserve integrated circuit space, depending on the implementation. But the benefits of distributed output port control occur only when the task of monitoring many output ports is divided among more than one monitor.

In an embodiment, each of the per-microbundle monitors 746 and 748 can be disposed on the same output module that contains the output port whose bandwidth allocation the monitor controls. In this case the monitor can observe the actual bandwidth utilization of each microbundle directly through the output port. But information packets have a latency as they traverse the switching fabric from input module to output port, and quite a large number of packets can be in-flight through the fabric at any given point in time. The latencies occur in large part because the data path passes through one or more queues as it traverses the fabric, and also because of re-ordering delays in the output modules as the various blocks of a frame are striped to different data paths through the intermediate stage(s) of the fabric. More importantly, the number of packets in-flight through the fabric is not known by a monitor observing bandwidth utilization only at the output port. Thus the feedback control loop implemented by such a monitor can be highly underdamped, resulting in unacceptably large excursions above and below the average bandwidth utilization desired for each microbundle.

In an aspect of the invention, therefore, the per-microbundle monitor observes microbundle bandwidth utilization not at the output port, but it at points upstream of the output port and upstream of the output port scheduler 742. If there are queues in the data paths traversing the network, then the monitors observe microbundle bandwidth utilization upstream of at least one of the queues. Preferably, the per-microbundle monitors 746 and 748 observe microbundle bandwidth usage at the point they are scheduled for transmission into the fabric by the appropriate microbundle scheduler 734, 736, 738 or 740 in the input modules 710 and 712, before the data packets of the flow are striped to multiple data paths across the fabric. In an embodiment, the input modules 710 and 712 transmit control messages to the monitors 746 and 748 periodically, indicating the number of packets (or the number of information bytes or blocks) that the input module has transmitted into the network for each microbundle.

The per-microbundle monitors 746 and 748 also do not observe packets actually being transmitted through the output ports directly. Instead, they receive feedback messages from the output ports indicating the number of bytes transmitted. Therefore, there is no particular reason for them to be located on the output modules. They could be located on the input modules, or on the intermediate stage modules, or on some other control module somewhere else in the system. The per-microbundle monitors are therefore "virtual" in two different senses. First, they are virtual in the sense that they do not monitor actual per-microbundle packet flow through the output ports, but rather monitor per-microbundle packet flow from the input modules for predicting per-microbundle bandwidth utilization through the output ports. Second, they are virtual in the sense that they need not be located in the modules containing the output ports whose bandwidth utilization they control. Nor must they be located in any module containing any part of the data paths carrying the flows that they monitor.

In an embodiment, in a three-stage switching fabric, the per-microbundle monitors are distributed across all of the intermediate stage modules. In an embodiment having half the number intermediate stage modules as output stage modules, each intermediate stage module contains the per-microbundle monitors for all of the output ports on two of the output stage modules. In the present embodiment it is convenient to locate the monitors on the intermediate stage modules, for several reasons. First, data paths already exist for carrying data from all of the input modules to each of the intermediate stage modules. Thus the control messages transmitted by the input modules to indicate microbundle transmissions into the fabric, can be transmitted "in-band" using the same conductors as the data packets themselves. Second, data paths already exist also for carrying data from the output modules, to the intermediate stage modules containing the monitors that control the ports on those output modules. Thus the control messages transmitted by the output modules to indicate total packet transmissions through the output ports, also can be transmitted "in-band" using the same conductors as the data packets themselves. Third, because the modular architecture of the present embodiment uses the same Cashmere integrated circuit chip both as input modules and intermediate stage modules, many of the same structures used for per-thread monitoring in the input modules (described hereinafter) can be re-used as per-microbundle monitors in the intermediate stage modules. Note that in the present embodiment, both the control messages transmitted by the input modules (referred to herein as "feed-forward" messages) and the per-microbundle backpressure signals transmitted by the monitors back to the microbundle schedulers in the input modules, are transmitted out of band, on their own dedicated electrical conductors. The same is true of the feedback control messages being fed back from the fabric output ports to the monitors. Thus in the present embodiment, the modular architecture of the system is the best reason for locating the monitors on the intermediate stage modules.

As mentioned, the per-microbundle monitors in FIG. 7 supervise the bandwidth utilization of microbundles sharing a fabric output port. A fabric output port is a physical port, but in general, as used herein, the term "port" includes both physical ports and logical ports. A "port" is used herein to refer to any aperture that has a bandwidth capacity, in that it can carry only a limited amount of information per unit of time. A "flow" does not itself have a bandwidth capacity; it has a bandwidth utilization. The bandwidth utilization of a flow is limited only if something external to the flow limits it, such as a scheduler or a policer. If the bandwidth utilization of a flow is being limited, then to upstream entities trying to share the bandwidth of the flow, the flow appears to have a limited bandwidth capacity. Thus to those entities, the flow is also a logical "port".

In the input modules 710 and 712, to the fabric input ports, each microbundle flow has a limited bandwidth capacity—approximately the average bandwidth allocation enforced by the corresponding per-microbundle monitor. Thus to the input threads, the ingress to a microbundle flow appears as a "port", the bandwidth capacity of which must be shared by all of the individual threads of a particular class and destined for a common output port. One embodiment could enforce per-thread bandwidth allocations by implementing separate per-thread input queues. These queues would fill up as input blocks arrive and are placed in a particular input queue, and would empty as blocks are drawn from the input queues, which would occur in proportion to their bandwidth allocations in the appropriate microbundle. When an input queue is full, it would send backpressure upstream to the corresponding data source. But that strategy would require a huge number of separate input queues, which can be extremely difficult to implement. In an input module having eight input ports, eight output ports and supporting six classes of service, for example, 384 separate input queues would be required. Instead, therefore, an input module in the present embodiment implements only one input queue per microbundle and approximates per-thread bandwidth allocations using backpressure asserted by per-thread monitors 750. This scheme is similar to that used for enforcing per-microbundle bandwidth allocation of a fabric output port as described above, except that the per-thread monitors 750 are not "virtual". The per-thread monitors 750 do monitor actual packet transmissions into a microbundle, and they are located on the same modules through which passes the data flows being monitored.

Per-microbundle Monitor Implementation with Microbundle Leaky Buckets

Figure 8:
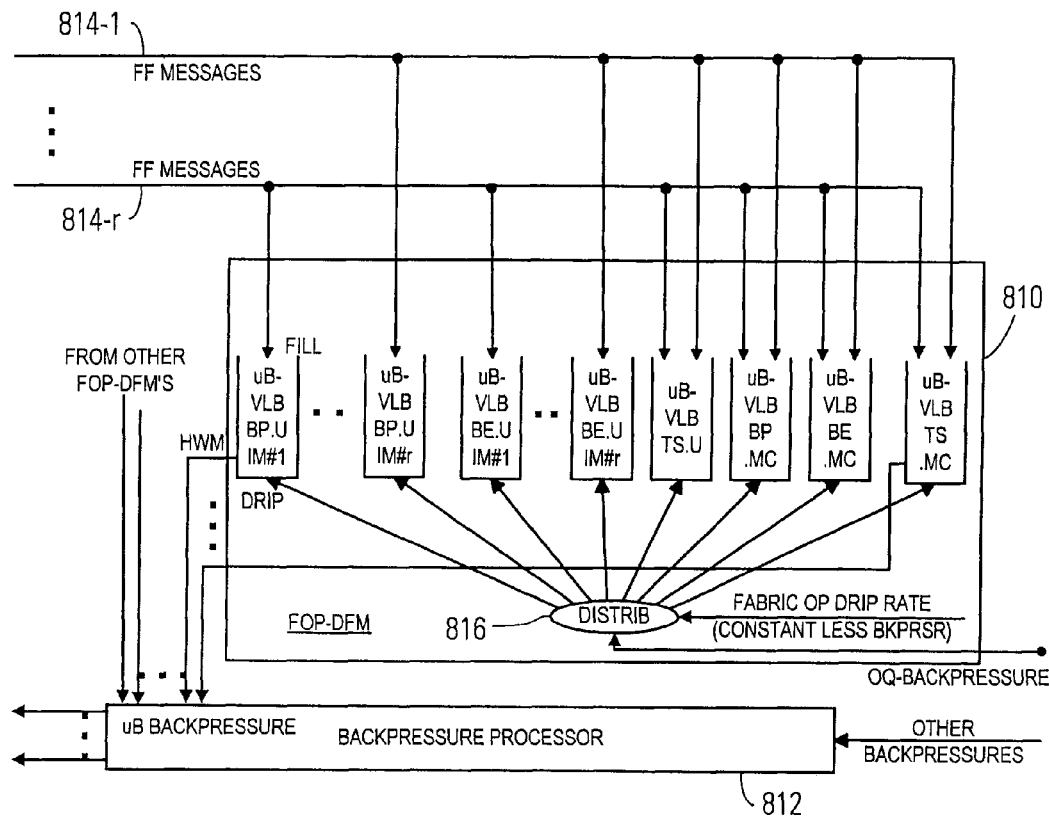
FIG. 8 is a functional block diagram of a per-microbundle monitor in an intermediate stage module.

FIG. 8 is a functional block diagram showing one of the per-microbundle monitors 746 in an intermediate stage module. As previously mentioned, each intermediate stage module contains a monitor corresponding to each of the output ports on two output stage modules. Thus if an output stage module has 8 output ports, each intermediate stage module contains 16 per-microbundle monitors. These monitors are shown in FIG. 8 as including a separate fabric output port dataflow monitor (FOP-DFM) 810 for each supervised fabric output port, plus a single common backpressure processor 812 shared by all the FOP-DFMs on an intermediate stage module. In actual implementation, all the FOP-DFMs on a single intermediate stage module are implemented together as a single unit.

The FOP-DFMs 810 use virtual leaky buckets to implement the monitoring functions. A "leaky bucket" checks whether traffic conforms to a desired maximum sustained rate and burst size, or shapes traffic so that it does conform to a desired max sustained rate and burst size. Whenever a data unit is transmitted toward a downstream queue, the leaky bucket is "filled" by a quantity corresponding to the length by which the packet will increase the queue length. The bucket also "leaks" (or "drains" or "drips") at a controlled rate corresponding to the rate at which packets are expected to depart from queue. The drip rate need not correspond to actual packet departures, but typically the actual packet departure rate average over some period of time matches the average leak rate of the leaky bucket, and the deviation between the two at any given point in time is bounded. The leak rate may be closed loop, in the sense that it is responsive in some way to actual packet departures from the queue. Alternatively, it may be open loop, in the sense that the leak rate is generated independently from the actual departures, but designed to match in some sense the actual departure rate anyway. When the leaky bucket reaches a "high water mark" fill level, corresponding to a queue length beyond which the transmission of additional packets toward the queue risks queue overflow, some action is taken, such as withholding additional packets or marking them as "non-conforming" and subject to being dropped in the event of downstream congestion. When the fill level falls to a "low water mark", normal operation resumes. The high and low water marks may be equal or unequal in various embodiments, and can be fixed or dynamic in various embodiments. In embodiments herein, new packets being sent toward the queue are accounted for by adding to the leaky bucket fill level, while packet departures from the queue are accounted for by lowering the leaky bucket fill level. Other implementations can of course use the opposite convention. Additionally, leaky buckets often are implemented with a counter corresponding to the fill level, although that is by no means the only way to implement a leaky bucket. In embodiments herein, increases in the fill level of the bucket are represented as increases in the count, and decreases in the fill level are represented as decreases in the count. Again, other implementations can use the opposite convention. More generally, therefore, it can be said that packets entering a flow change a count in one direction, and packets leaving the flow change the count in the opposite direction.

The FOP-DFMs 810 use the leaky buckets not for approximating the length of a queue, but for approximating average bandwidth utilization of microbundles. They do not correspond individually to individual physical downstream queues, and do not attempt to represent or predict the length of any physical downstream queue. They differ from conventional leaky buckets also because they are virtual, in the senses described previously with respect to FIG. 7. The microbundle virtual leaky buckets (uB-VLB) do not count data blocks as they go by; instead the input modules send feed-forward control messages to notify the intermediate module containing the uB-VLB for each particular output port of the number of blocks that the input module has sent of each class destined for that particular output port. Again, those data blocks need not have come through the intermediate stage module containing the uB-VLB. They could have come through any of the intermediate stage modules instead.

Referring to FIG. 8, each FOP-DFM 810 includes one uB-VLB corresponding to each information flow whose rate is being separately regulated. In the embodiment described herein, the information flows to a given fabric output port include, from each input module, a BE-class unicast flow, a BProv-class unicast flow, a TS-class unicast flow, as well as a multicast flow of each of the three service classes. In one embodiment, each of these flows can be separately rate-controlled by separate uB-VLBs in the FOP-DFM. In other embodiments, subsets of these flows can be grouped together and rate-controlled as a group, by uB-VLBs corresponding to each subset. In the embodiment described herein, each of the BE and BProv class unicast flows are rate-controlled separately, all of the TS-class unicast flows toward a given fabric output port are rate-controlled as a group, all of the BE-class multicast flows that include a given fabric output port in their multicast groups are rate-controlled as another group, all of the BProv-class multicast flows that include a given fabric output port in their multicast groups are rate-controlled as yet another group, and all of the TS-class multicast flows that include a given fabric output port in their multicast groups are rate-controlled as still another group. Thus each FOP-DFM includes 2r+4 uB-VLBs, where r is the total number of input modules supported by the fabric.

The FOP-DFM receives feed-forward (FF) control blocks from each of the r input modules. The control blocks are received by the intermediate stage module on r separate FF control buses 814-1 through 814-r (representatively 814). In one embodiment they arrive staggered, but in other embodiments they all arrive concurrently or partially staggered. The FF control block from each input module i contains the information set forth in Table I:

TABLE I

| Header |
|---|
| For each output port j supervised by this intermediate stage module, a count of the number of BE-class unicast blocks sent by input module i toward output port j since the previous FF control block |
| For each output port j supervised by this intermediate stage module, a count of the number of BProv-class unicast blocks sent by input module i toward output port j since the previous FF control block |
| For each output port j supervised by this intermediate stage module, a count of the number of TS-class unicast blocks sent by input module i toward output port j since the previous FF control block |
| For each output port j supervised by this intermediate stage module, a count of the number of BE-class multicast blocks sent by input module i toward multicast groups that include output port j since the previous FF control block |
| For each output port j supervised by this intermediate stage module, a count of the number of BProv-class multicast blocks sent by input module i toward multicast groups that include output port j since the previous FF control block |
| For each output port j supervised by this intermediate stage module, a count of the number of TS-class multicast blocks sent by input module i toward multicast groups that include output port j since the previous FF control block |
| For each output port j supervised by this intermediate stage module, a count of the number of BE-class unicast threads destined for output port j from input module i that are active (the reason for this information is explained below) |

Upon receipt of a FF control block, each affected uB-VLB increases its count by the number of blocks specified. Thus in response to a FF control block from each input module i, the fill levels in the following uB-VLBs in the FOP-DFM for each output port j will be increased (unless the number of blocks specified is zero, of course):

the uB-VLB for the BE-unicast microbundle from input module i to output port j;

the uB-VLB for the BProv-unicast microbundle from input module i to output port j;

the uB-VLB for all TS-unicast flows destined for output port j;

the uB-VLB for all BE-multicast flows that include output port j in their multicast group;

the uB-VLB for all BProv-multicast flows that include output port j in their multicast group; and the uB-VLB for all TS-multicast flows that include output port j in their multicast group;

Each uB-VLB in the FOP-DFM 810 also decreases its count ("leaks") at a controlled rate which is a predetermined fraction of the actual, constant rate at which the output queue for that output port empties (absent its own backpressure). For example, if the fabric output port has a 10 Gbps data rate, and a particular microbundle is assigned 35% of that data rate, then the uB-VLB for that microbundle will leak at 3.5 Gbps (absent backpressure). If the output port needs to stop emptying, because it has received backpressure from some further downstream element, then the output module copies the backpressure signal to the corresponding FOP-DFM in the appropriate intermediate stage module, causing all the uB-VLBs for flows destined for that fabric output port to suspend leaking.

Figure 9:
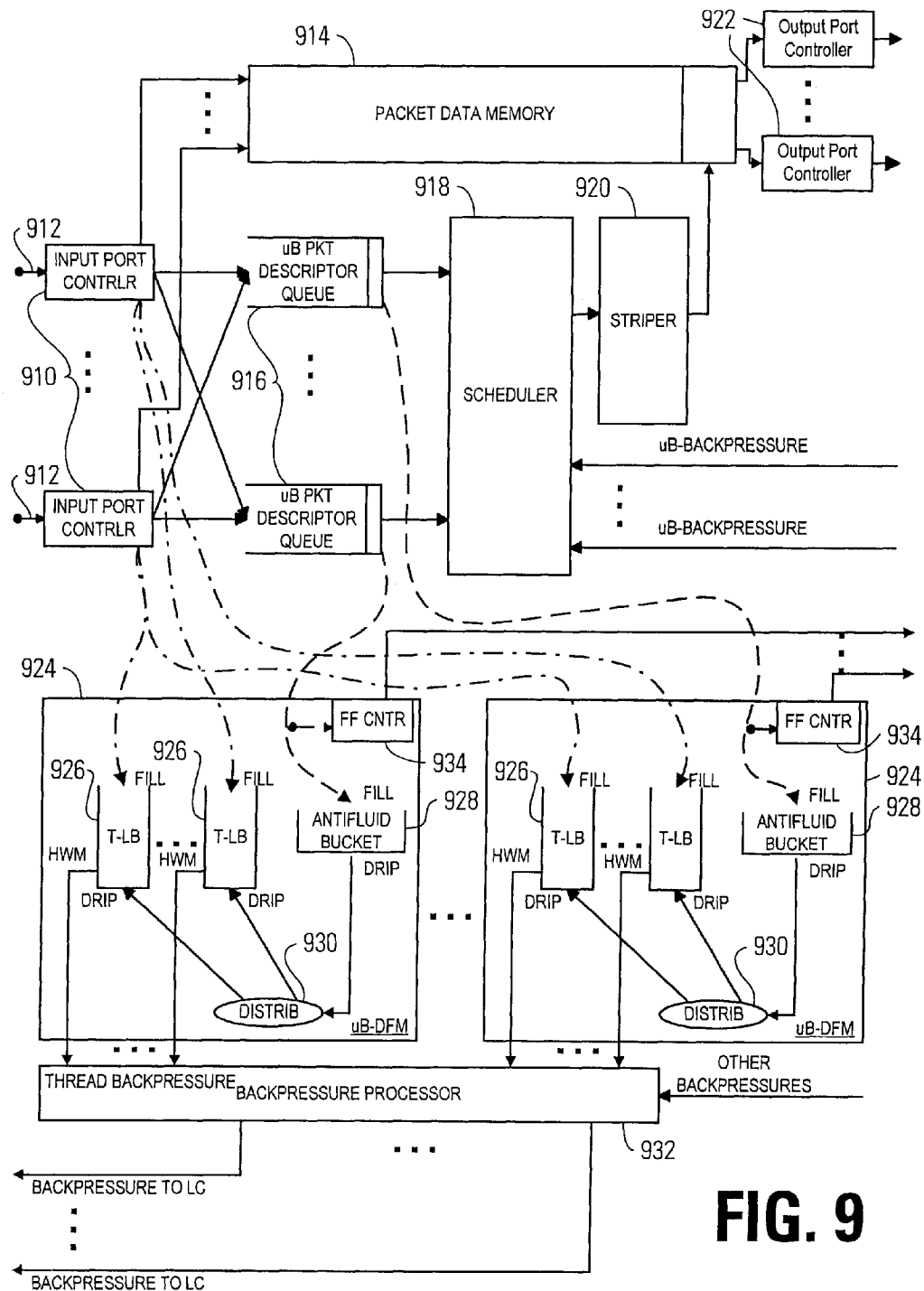
FIG. 9 is a functional block diagram of certain components of an input module.

In another embodiment, each FOP-DFM 810 includes an antifluid bucket similar to that described below for the uB-DFMs 924 (FIG. 9). The FOP-DFM 810 receives periodic messages (called "feedback control messages") from the fabric output port with which it is associated, indicating the total number of data blocks that have been transmitted through that fabric output port. These messages fill the antifluid bucket, which drips at the fixed data rate of the fabric output port. These antifluid bucket drips are distributed to the uB-VLBs in order to set their respective leak rates. If the fabric output port receives backpressure from a downstream element, there is no need for it to assert an affirmative backpressure back to the FOP-DFM 810. Instead, the number of transmitted blocks that it reports back to the FOP-DFM in the feedback control messages will simply fall to zero and the antifluid bucket will stop being filled. The uB-VLBs for flows destined for that fabric output port will suspend leaking when the antifluid bucket reaches empty.

The overall drip rate for a given fabric output port is distributed among all the uB-VLBs in the corresponding FOP-DFM 810 by a distributor 816 in accordance with the average bandwidth allocation desired for each information flow (or group of information flows controlled together). The distributor 816 can be thought of as receiving clock ticks at the same rate that data blocks are being transmitted through the fabric output port, and then distributing those ticks to the individual uB-VLBs in a round-robin or weighted round-robin sequence. (In an implementation, the ticks can be accumulated and applied as a quantity to the distributor, and/or they can be accumulated in the distributer per-leaky bucket, and applied as a quantity to each leaky bucket.) The ticks stop while fabric output port backpressure is asserted (or the antifluid bucket empties). For example, if all information flows are to receive equal average bandwidth allocations, then the block departure ticks are distributed in pure round-robin fashion among all the uB-VLBs in the FOP-DFM 810. If flow A is to receive twice the average bandwidth allocation as flow B, then twice as many block departure ticks are distributed to the uB-VLB for flow A in each round as to the uB-VLB for flow B.

In the embodiment described herein, the distributor 816 distributes the fabric output port drip rate among the uB-VLBs using a 2-level WRR distribution algorithm. In the first level, referred to as an across-class allocation, the distributor 816 distributes the block departure ticks among categories defined by service class and casting type. There are three service classes (BE, BProv and TS), each of which support two casting types (unicast and multicast), for a total of six categories. The relative weights assigned to these categories are programmable (provisioned). The across class allocation happens periodically, and each period ("epoch") has two passes. The epoch starts with a desired total drain amount, say X. In pass 1, Each of the six categories are visited, and given some portion of the drain amount equal to min(class_weight, depth of class bucket—or collective depth of microbundle buckets of that class and output). If some of the categories are not using all their allocated bandwidth, at the end of pass 1 not all of X will have been allocated because some categories will have less fluid to be drained than their class weight. In pass 2, the remaining portion of X is given away in a strict priority fashion.

In the second level, the block departure ticks distributed to each category are further distributed among all the uB-VLBs in that category. The distribution strategy within different categories can be different from each other. In the present embodiment, in the BE-unicast category, the ticks are distributed among the uB-VLBs for all the BE-unicast microbundles supervised by this FOP-DFM, in proportion to the number of active threads they contain. The number of active threads contained in each BE-unicast microbundle is reported to the intermediate stage modules periodically as part of the FF control blocks, as mentioned above. Again, if a particular uB-VLB is empty, then the distributor skips that uB-VLB during its rotation. This strategy, in conjunction with a similar strategy for draining BE-unicast thread leaky buckets in the input module, allows the bandwidth leftover after all the fixed allocations to be distributed to all the active BE-unicast threads in "max-min fair" proportions. Another embodiment could achieve a reasonably fair allocation among the BE-unicast threads, with less complexity but also without "max-min" fairness by distributing the BE-unicast block departure ticks equally among all BE-unicast microbundles destined for that fabric output port, regardless of how many threads are active in each such microbundle.

In the BProv-unicast category, the ticks are distributed among the uB-VLBs for all the BProv-unicast microbundles supervised by this FOP-DFM, in proportion to the bandwidth-provisioned allocations that have been guaranteed to the threads they contain. The present embodiment does not adjust this distribution for inactive threads, as is done for the BE-unicast category, so bandwidth that is guaranteed but unused by a particular thread does not get allocated in a true max-min fair manner among the remaining (active) BProv-unicast threads. Instead, only the BProv-unicast threads within the same microbundle (i.e. coming from the same input module) share this extra bandwidth. max-min fairness therefore is not always achieved in the BProv-unicast category, but it is approximated. Another embodiment of course could adjust for inactive threads. Again, if a particular uB-VLB is empty, then the distributor skips that uB-VLB during its rotation.

In each of the other categories, TS-unicast and multicast, BE-multicast and BProv multicast, no further allocation of block departure ticks is made in the second level of the distribution algorithm because within each of these categories, all flows to the particular output port are controlled as a group. So these categories are rate-controlled in the FOP-DFM 810 by only one uB-VLB each, and the block departure ticks allocated to these categories are applied to the corresponding uB-VLB directly.

In response to each block departure tick received by a uB-VLB, the uB-VLB decrements (drains) its fill level by one block. If the information flow or flows controlled by the particular uB-VLB is transmitting data at exactly its allocated bandwidth, then the drip rate of the uB-VLB will exactly match the fill rate, and the level of fluid in the uB-VLB will remain constant. If the information flow is using less than its allocated bandwidth, then the fluid level in the uB-VLB will gradually drop until it is empty. At that time the distributor 816 will stop allocating block departure ticks to that uB-VLB, until the fluid level increases again. If the information flow is using bandwidth at an uneven rate that still averages over some period of time to its allocated bandwidth, then as long as the information flow is not too bursty, the fluid level in the uB-VLB will not vary too far from a constant level. But if information flow is too bursty, or if its bandwidth utilization is consistently greater than its allocation, then the fluid level in the uB-VLB will gradually increase until it reaches a predefined high water mark (HWM). At that time it asserts a microbundle-level backpressure signal to backpressure processor (BPP) 812. Because the HWM is used herein to trigger backpressure, HWM is sometimes referred to herein as a backpressure assertion level.

BPP 812 combines the HWM signals from all of the uB-VLBs in all of the FOP-DFMs in the same intermediate stage module, as well as other backpressure signals not important for an understanding of the present invention, and forwards them out-of-band to the individual input modules. A HWM assertion from a uB-VLB governing one individual microbundle (e.g. a BE or BProv unicast microbundle), is sent to only the input module that originates that microbundle and affects only that microbundle. A HWM assertion from a uB-VLB governing the TS unicast flows to a given fabric output port is forwarded to all of the input modules, and all of them will stop sending TS unicast packets toward that fabric output port. A HWM assertion from a uB-VLB governing a class of multicast flows to a given fabric output port is also forwarded to all of the input modules, and all of them will stop sending packets in the same multicast class. Note that this means that backpressure from any one of the fabric output ports in a particular multicast group will stop all new traffic in all multicast flows of the same class, regardless of whether the multicast flow includes that fabric output port. Another embodiment can backpressure multicast flows with finer granularity.

After backpressure is asserted for a particular flow or group of flows, the fluid level in the controlling uB-VLB might still increase somewhat due to more packets being scheduled for transmission by the input module(s) before the backpressure notification is received, but assuming the fabric output port is not itself backpressured, this fluid level soon will start to decrease because of the continued steady drip due to block departure ticks still being allocated to the uB-VLB by the distributor 816. Soon the fluid level will fall below a low water mark (LWM), and uB-VLB will assert a LWM signal to the BPP 812. In response, the BPP will release (negate) its backpressure assertion against the controlled flow or group of flows.

In one embodiment, the high and low watermarks used by the uB-VLBs are equal to each other, and they are represented by a single signal that is either asserted (HWM) or negated (LWM). But they are not simply Full and Not Full. The uB-VLBs must assert backpressure early, to ensure sufficient space in the output port queues to receive packets that have been sent by an input module but that the uB-VLB has not yet been made aware of via a feed-forward command block, as well as packets that are sent by an input module between the time that HWM is asserted and the time that the input module receives and can act upon the backpressure message. The actual high and low water marks vary dynamically, as explained in more detail hereinafter. In addition, although the high and low water marks at any given time are equal to each other, or in some embodiments different from each other by a small fixed amount such as one block, the actual uB-VLB values (fill levels) still vary significantly above and below these watermarks because of the latencies mentioned above.

Per-Thread Monitor Implementation with Thread Leaky Buckets

FIG. 9 is a functional block diagram of certain components of an input module, emphasizing components relevant to the flow control mechanism. The module includes a plurality of input port controllers 910, each of which control data packets arriving from an upstream line card (not shown) via a respective input port 912. As incoming data packets arrive, their data is transmitted into a packet data memory 914, and all subsequent processing in the input module takes place on descriptors which describe the packet and identify its location in packet data memory 914. Other embodiments can of course move actual data.

In the BE and BProv unicast classes, the bandwidth usage is controlled at the thread level, meaning the flow of data into a given microbundle from one input port 912 might be backpressured while the flow of data into the same microbundle from another input port 912 is not. Since this means that a scheduler has to be able to skip over some packets in its selection of next-packets to be transmitted into a microbundle, per-thread backpressure conventionally would require either separate queues for each thread, or a complex scheduler that can select packets not at the head of a queue. But in the present embodiment the same result is approximated using bookkeeping methods in conjunction with only one queue per microbundle. Thus the present embodiment includes only one queue 916 per microbundle in the BE and BProv unicast classes.

In an embodiment, the same consolidation of queues could be performed for each of the other classes as well. In the TS-unicast class, however, such consolidation into a single queue per microbundle may be more costly than desirable. The present embodiment therefore includes a separate thread queue for each input port 912 and each TS-unicast microbundle. Nevertheless, all the threads in a TS-unicast microbundle are still backpressured together. Backpressure for a TS-unicast microbundle render all component thread queues ineligible for scheduling. Backpressure for a TS-unicast microbundle is also copied directly to all ingress line cards feeding this input module, requiring them to stop transmitting TS-unicast packets.

For the same reasons, the input module includes separate thread queues for each input port and each microbundle in each of the multicast classes. All multicast threads of a particular class are backpressured together, regardless of input port and regardless of multicast group, and backpressure received for a multicast class is copied directly to all ingress line cards feeding this input module. Another embodiment could instead backpressure the line cards with a different granularity, for example individually by multicast group, or by notifying the line card to stop sending any multicast packets in the particular multicast class for which a particular congested fabric output port is included in the multicast group. Other variations will be apparent.

The input port controller 910 writes descriptors for each incoming packet into the appropriate microbundle packet descriptor queue 916 for transmission toward the correct output module in the correct microbundle. Note that no multicast copying takes place in the input modules; all multicast copying takes place in the intermediate stage and output stage modules.

The input module further includes a scheduler 918 for selecting each next packet for transmission out the input module output ports toward the intermediate stage. As with the output port schedulers (FIG. 7), the scheduler 918 need not be very complex because thread level bandwidth allocations are enforced by the backpressure mechanism rather than by the scheduler. The scheduler does, however, receive the microbundle backpressure signals from the per-microbundle monitors in order to implement the microbundle level backpressure, and skips over the queue for each microbundle that is backpressured. The scheduler 918 also skips over queues that are empty. The scheduler 918 transmits the descriptor for each next selected packet to a striper 920 which chooses the best input module output port (and therefore which intermediate stage module) through which the packet should be forwarded. The striper 920 so notifies the appropriate output port controller 922 in the module, which retrieves the data packet from packet data memory 914 and transmits it.

The input module also includes a data flow monitor for each bandwidth-controlled flow from the input module, identified on the drawing as microbundle data flow monitors (uB-DFMs) 924. Each uB-DFM 924 includes a thread-level leaky bucket (T-LB) 926 for each thread destined for the bandwidth controlled microbundle, and an "antifluid" bucket 928 for the entire microbundle. Whenever a data block is received into the input queue 916 for a given microbundle, the T-LB for the thread containing that data block is incremented by a quantity indicating the length of the data packet. The quantity can be indicated as a number of bytes, or a number of blocks, or any other desired granularity.

For decrementing the T-LBs, in conjunction with the transmission of data blocks out of a microbundle input queue, all of the T-LB's for that microbundle are decremented (leak) in proportion to their relative thread-level bandwidth allocation. (In an embodiment, the decrementing can be done in response to actual data block transmissions through the input module output ports.) For a BE microbundle, for example, the T-LBs for all threads feeding that microbundle leak equally. For a BProv microbundle, the T-LBs for all threads in the microbundle leak in proportion to their provisioned bandwidth allocation. A T-LB will not leak if it is empty. The signals indicating dequeuing of data blocks from the microbundle input queues are also provided to feed-forward counters 934 in each of the uB-DFMs, which keep track of the number of blocks that have been scheduled for transmission in each microbundle originating at the input module. The feed-forward counters 934 periodically transmit their counts to the per-microbundle monitors in the intermediate stage modules as the previously mentioned feed-forward messages, and then zero their counts to begin the next count period.

Because the actual transmission of data blocks into a given microbundle does not occur at a steady rate, each uB-DFM 924 also includes an "antifluid" bucket 928 to even out the drip signals applied to the T-LBs. The bucket 928 is itself a leaky bucket, which fills in response to observed events and leaks at a steady rate if not empty. In particular, each transmission of a block from a microbundle queue 916 increases the fill level in the antifluid bucket 928 in the uB-DFM corresponding to that microbundle. The antifluid bucket 928 itself drips at a steady rate, unless empty. The antifluid bucket in effect acts as a low pass filter (LPF), and in fact another embodiment could implement an actual LPF or other similar structure in place of the antifluid bucket. Similarly to the FOP-DFMs, the drip rate from the antifluid bucket 928 is distributed among all the T-LBs in the uB-DFM 924 by a distributor 930 in accordance with the average bandwidth allocation desired for each component thread. As with the distributor 816 (FIG. 8), the distributor 930 can be thought of as receiving clock ticks at the same rate that antifluid is dripping from the antifluid bucket 928, and then distributing those ticks to the individual T-LBs in a round-robin or weighted round-robin sequence. For example, in the BE-unicast class, in which all information flows are to receive equal average bandwidth allocations, the antifluid ticks are distributed in pure round-robin fashion among all the T-LBs in the uB-DFM 924 that are not already empty. In the BProv-unicast class, the antifluid ticks are distributed in WRR fashion among all the T-LBs in the uB-DFM 924 that are not already empty, in proportion to the relative bandwidth allocation of the corresponding thread.

Backpressure from the relevant per-microbundle monitor does not necessarily stop the dripping of antifluid immediately; instead it only stops the filling of the corresponding antifluid bucket 928 because packets are no longer being scheduled for transmission into that microbundle. If the microbundle backpressure continues for long enough, then the antifluid bucket 928 will eventually empty, and then the dripping of antifluid will stop.

When a T-LB reaches a high-water-mark, backpressure is asserted "per input port", meaning that the input module sends backpressure upstream to the data source for the corresponding input port, stopping all data from that input port, not just data from the offending thread. The HWM values used in the T-LBs are calculated dynamically, as described below. Other input ports of the same or different input modules destined for the same output port are not affected. This is in contrast to many conventional systems, which have to stop all input ports carrying threads destined for a particular output port, even if they are not the threads exceeding their bandwidth allocation. This level of granularity is a consequence of the thread- and microbundle-level backpressure described herein. In another embodiment, the backpressure asserted to the upstream line cards can have a different granularity, for example stopping data in only the offending thread, or in threads of all classes destined for the same output port, or threads of the same class destined for any output port. The HWM signals from all the T-LBs 926 in all the uB-DFMs 924 are combined in a single backpressure processor (BPP) 932 for the input module, which also combines backpressure from other sources not pertinent for an understanding of the invention. The BPP 932 then forwards the signals as backpressure to the individual ingress line cards.

It can be seen that T-LBs are similar to uB-VLBs in that they control bandwidth utilization of individual components entering a downstream pipe that has limited bandwidth capacity: T-LBs control the bandwidth utilization of threads being transmitted through a microbundle, and uB-VLBs control the bandwidth utilization of microbundles being transmitted through a fabric output port. T-LBs differ from uB-VLBs, however, in that thread leaky buckets 924 do observe the arrival of data blocks into the queue directly, whereas uB-VLB's do not.

It can also be seen that in these leaky buckets, the fill rate is the rate of actual packet transmission, the drain rate is the desired average rate of packet transmission, and the HWM helps to set a limit on allowable burst size. If the rate of actual packet transmission exceeds the average set by the drain rate by a sufficient amount for a sufficiently long period of time, the level of the leaky bucket will reach the HWM. Thereafter, assuming the LWM is the same as the HWM, the actual packet transmission rate will be limited to the desired average rate (the drain rate). If the actual packet transmission rate falls below the desired average rate, then the fluid level in the leaky bucket will start to drop, permitting a gradually-increasing ability to transmit bursts. If the rate of actual packet transmission continues below the desired average rate, by a sufficient amount for a sufficiently long period of time, then the fluid level in the leaky bucket will gradually fall below the nominal starting level, and thereby enable the sender to send large bursts. Thus if actual usage is above the desired average, then only small bursts (or no bursts) will be allowed. If actual usage is below the desired average, then large bursts will be allowed.

In embodiments described herein, the fluid level of a leaky bucket is not allowed to fall below a predefined minimum level, such as zero. By setting a minimum level, the absolute maximum burst size is limited by the difference between the minimum and the HWM, even if the flow has not used any bandwidth at all in the recent past. Other embodiments can use different fill levels as the minimum level, or can omit any practical minimum level altogether (such as by allowing the fill level to go negative).

In light of the above, it can be seen that the effect of the distributor 816 in a FOP-DFM 810, or a distributor 930 in a uB-DFM 924, is to set the desired average bandwidth utilization for the flow controlled by each respective leaky bucket. The desired average bandwidth utilization for a given flow is defined by the number of block departure ticks allocated by the distributor to the corresponding leaky bucket per unit time. In embodiments described herein, where a leaky bucket does drain to its minimum level, the way the system prevents further leaking is by not allocating additional block departure ticks to that bucket until the level increases due to new traffic. The use of a cyclical (RR, WRR, DRR, etc.) allocation of such ticks provides the advantage that the system can prevent further leaking of a particular bucket simply by skipping over that bucket during the rotation. This results in a greater number of block departure ticks being allocated to the remaining leaky buckets per unit time, effectively setting a higher desired average bandwidth utilization for the flows corresponding to those leaky buckets, which in turn effectively re-distributes bandwidth unused by inactive flows, to those flows that are active. This redistribution of unused bandwidth is proportional to the relative bandwidth allocations of all the flows still active, resulting in a "max-min fair" distribution of such unused bandwidth.

Guaranteed Per-Thread Bandwidth Provisioning Through Cascading of Backpressure Levels From the above, it can be seen that the fabric described herein guarantees a minimum bandwidth to the stream of bandwidth provisioned frames between each pair of line cards. The fabric also switches best-efforts frames with the maximum throughput given the topology of the fabric. These results can be achieved at low cost in the present embodiment in part because in the BE and BProv unicast classes the input modules do not implement individual input queues for each fabric input port. Instead, all input threads in these classes that are destined for a common fabric output port are queued together, in a combined microbundle queue, and the bandwidth utilization of each thread is controlled through thread-level backpressure rather than through scheduling. In addition, the use of backpressure rather than scheduling for guaranteeing bandwidth in the present embodiment also allows the mechanism to be distributed across multiple modules with minimal inter-module communication requirements. When scaling to larger fabrics, the complexity of any one module grows only linearly with respect to the number of fabric output ports.

The distributed nature of the mechanism for guaranteeing per-thread bandwidth allocations in part involves a cascading of two levels of flow control. The per-microbundle monitors 746 and 748 (FIG. 7) ensure that the flow of all bandwidth provisioned threads in a given class from an input module to a fabric output port receives at least its total pre-allocated bandwidth (on average over some period of time, and with limited burstiness), and the per-thread monitors 750 then ensure that each bandwidth provisioned thread into a given microbundle receives at least its own pre-allocated average bandwidth. The monitors also help ensure that any excess bandwidth allocated to but not used by a particular thread is shared fairly, in the max-min sense, among other flows.

The mechanism for guaranteeing per-thread bandwidth allocations also implements an optimal scheme for responding to congestion downstream of the switching fabric. According to the cascaded scheme, backpressure from a fabric output port does not immediately stop the flow of information packets across the fabric, nor does it stop the flow of information packets into the fabric from the ingress line cards. As previously mentioned, the per-microbundle monitors 746, 748 do not necessarily immediately copy such backpressure signals to any upstream component. Instead, fabric output ports stop serving packets to the congested egress line card and the uB-VLBs for microbundles destined for the backpressured fabric output port stop leaking. It is only when the uB-VLB for a particular microbundle reaches a pre-determined high-water-mark, does the corresponding per-microbundle monitor 746, 748 send its own backpressure to the input module originating that microbundle. Then, when an input module receives a backpressure assertion relative to a particular output microbundle, that indication also is not immediately copied to the input port controllers or the ingress line cards. Instead, the input module stops the flow of information packets into the microbundle, and stops filling the antifluid bucket 928 in the corresponding uB-DFM 924. If congestion continues then eventually the antifluid bucket 928 stops dripping, which stops dripping the T-LBs, and as incoming packets continue arriving into the microbundle packet descriptor queues 916, the T-LBs will continue to fill. It is only when a T-LB reaches a pre-determined high water mark does the input module send its own backpressure to the corresponding fabric input port. Thus the mechanism for guaranteeing per-thread bandwidth allocations is the same mechanism that responds to downstream congestion.

In the embodiments herein, backpressure signals are typically implemented as individual bits in a control word that is periodically transmitted to upstream data packet senders. If the bit corresponding to a particular flow is asserted (which can be defined as high or low in different embodiments), then that flow is backpressured; if unasserted, then that flow is not backpressured. In other embodiments, backpressure signals can be communicated by other mechanisms, such as by continuously transmitted signals, or by the absence of an expected signal (such as the absence of an acknowledgment). Many other ways of communicating backpressure will be apparent. In addition, whereas in the embodiments described herein backpressure completely stops the backpressured information flow until backpressure is released, in other embodiments backpressure might merely cause the sender to slow down its rate of transmitting packets.

Implementation Example—Single Cashmere Embodiment

Implementation details of a single Cashmere embodiment will now be described. In this embodiment, the fabric supports 16 bidirectional interfaces, 3 unicast classes (TS_U, BP_U and BE_U), and 3 multicast classes (TS_M, BP_M and BE_M).

Sharing between Classes, Unicast, and Multicast

The leaky bucket controller called Data Flow Monitor (DFM) in the device is responsible for monitoring the traffic bound to different outputs. The DFM maintains a set called Output Bucket Set (OBS) of Leaky Buckets (LBs) for each output port. Each set contains 16 Thread LBs (T-LBs) for Best Effort traffic, 16 T-LBs for Bandwidth Provisioned traffic, a single T-LB for all TS traffic, a single T-LB for all BE multicast, a single T-LB for BP multicast traffic, and a single T-LB for all TS multicast traffic bound for the corresponding output port. Each of the T-LBs are filled in proportion to the traffic of each type bound for the corresponding output port. The fill process is explained below.

Figure 10:
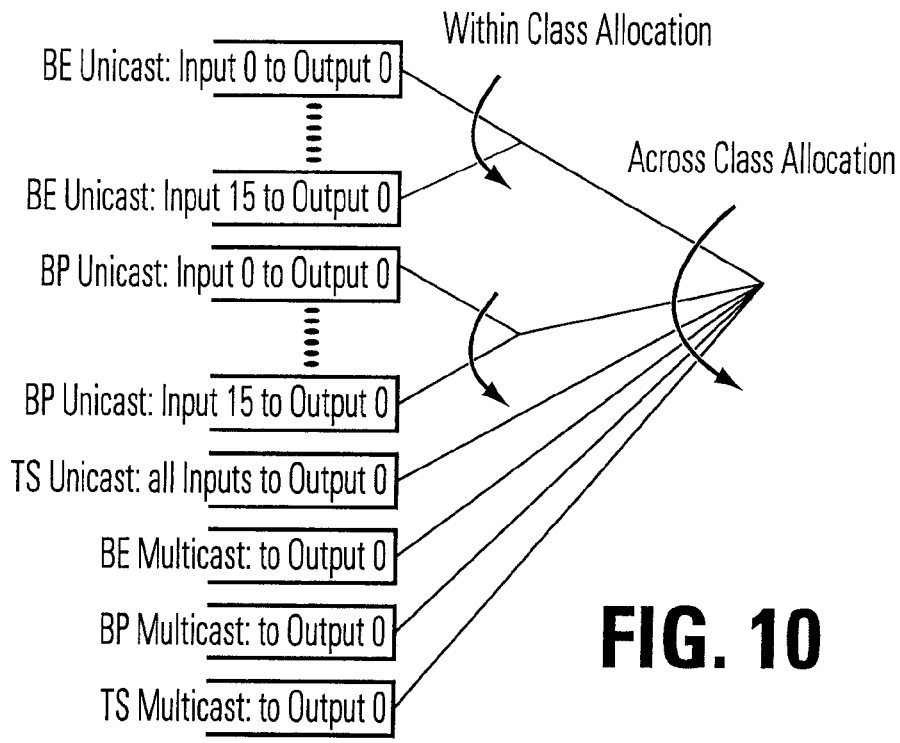
FIG. 10 is an algorithm drawing illustrating the draining hierarchy in a single-stage embodiment.

The DFM drains fluid from an OBS at the same bit rate as the output port rate. The DFM serves the OBS buckets using a hierarchical draining scheme, mimicking how an ideal centralized scheduler might fairly share the bandwidth between classes and between the different input ports. FIG. 10 is an algorithm drawing illustrating the draining hierarchy. At the first level of the hierarchy, the service is divided using a Weighted Round Robin (WRR) scheduler among BE Unicast, BP Unicast, TS Unicast, BE Multicast, BP Multicast, and TS Multicast. The weights of this scheduler are programmable. At the second level of the hierarchy, the service of both BE Unicast and BP Unicast is subdivided between the T-LBs of the different input ports. In the case of BE Unicast, the scheduler is simply Round Robin, while for BP Unicast the scheduler is WRR with programmable weights.

When one of the BE or BP T-LBs exceeds a threshold, the DFM commands the corresponding ingress line card to stop forwarding traffic for that thread, i.e., backpressures the thread. When the TS unicast T-LB exceeds a threshold, the DFM commands all ingress line cards to stop sending TS traffic to the corresponding output port. Similarly, when the BE, BP or TS multicast buckets go above the corresponding threshold, the DFM commands all ingress line cards to stop sending multicast traffic of that class to the corresponding output port.

The weights of the WRR scheduler are configurable. One choice is to set the weights for the TS and BP classes in proportion to the corresponding guaranteed bandwidth, and to set the weights for the BE class in proportion to the left over bandwidth. It is possible to bias these weights in favor of BP to make sure that traffic class gets its provisioned bandwidth.

Overflow Protection

Cashmere protects against overflow of memory and of descriptor FIFOs at output ports. The device maintains two thresholds for each class, high and low. When the total device-wide allocated memory reaches the high threshold, it generates a class backpressure to all line cards. Line cards are expected to stop transmitting frames of the backpressured class until they receive a resume indication. When the memory reaches the low threshold, the device sends a resume indication to all line cards. The thresholds for BE, BP and TS classes are in the increasing order. Similarly, the device also keeps track of the memory allocated per input port. There are high and low thresholds for asserting and releasing link backpressures to each output port on the basis of the corresponding allocated memory and the thresholds.

Cashmere has three class FIFOs for storing packet descriptors at each output port: BE FIFO, BP FIFO, and TS FIFO. When one of the 16 FIFOs of a class is above a threshold, the transmit side of the device informs the receive side buffers at all input ports to stop forwarding frames to that output port. This can lead to losses at the receive side. This is merely a fail-safe mechanism, since such a condition should not happen in normal operation.

Data Structures and Algorithms

Figure 11:
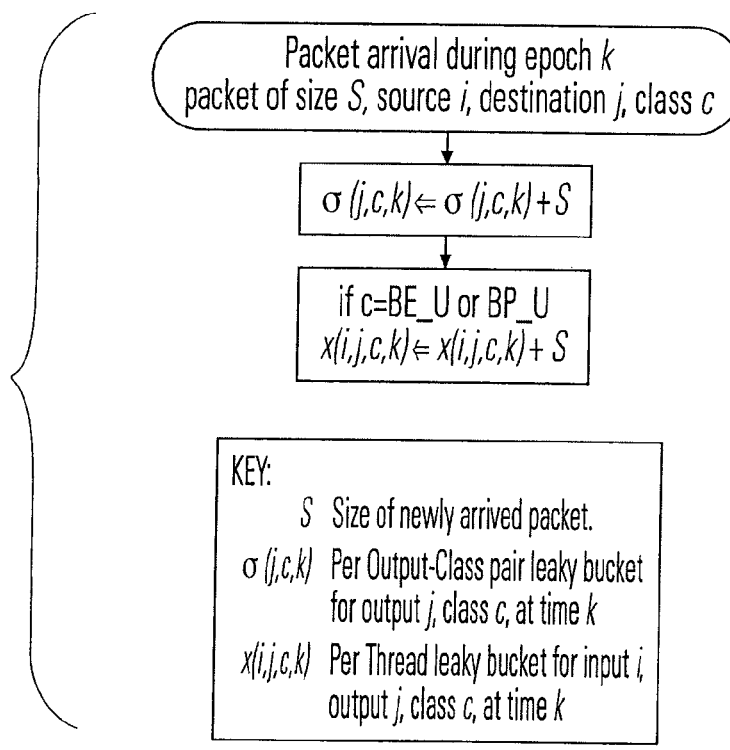
FIG. 11 sets forth a process for filling output-class pair leaky buckets.

As discussed above, a set of Leaky Buckets (T-LBs) are used to control the sharing of bandwidth at each of the 16 output ports. For each output port, there is a Output-Class Pair Leaky Bucket for each of 6 classes (TS Unicast, TS Multicast, BP Unicast, BP Multicast, BE Unicast, BE Multicast.) Each output has an additional set of 16 finer granularity or thread level buckets for BE Unicast, and an additional set of 16 thread level buckets for BP unicast. These finer granularity buckets keep counts of traffic from a particular input to a particular output of a particular class. In contrast the coarser Output-Class buckets count traffic from all inputs to a particular output class pair. FIG. 11 sets forth the process for filling the output-class pair leaky buckets.

Each T-LB has "fluid" added to it whenever traffic of the corresponding type arrives at the Cashmere device. The set of 6 Output-Class Buckets is drained at a cumulative rate equivalent to the nominal rate of the output port plus some speedup. The exact cumulative drain rate is configurable in the device register setup. This cumulative drain rate is divided among the 6 buckets for BE unicast, BP unicast, TS unicast, BE multicast, BP multicast, and TS multicast. In a second level of the hierarchy, a within class scheduler for BE unicast is told how much was drained from the Output-Class Pair bucket in that epoch, and then this drain amount is distributed among the finer granularity thread leaky buckets. The same process happens in parallel for BP unicast, but the finer granularity drain does not extend to the 4 remaining classes. In this section, we begin by discussing the drain algorithm, and then continue with a discussion of the threshold computation.

Leaky Bucket Draining

Figure 12:
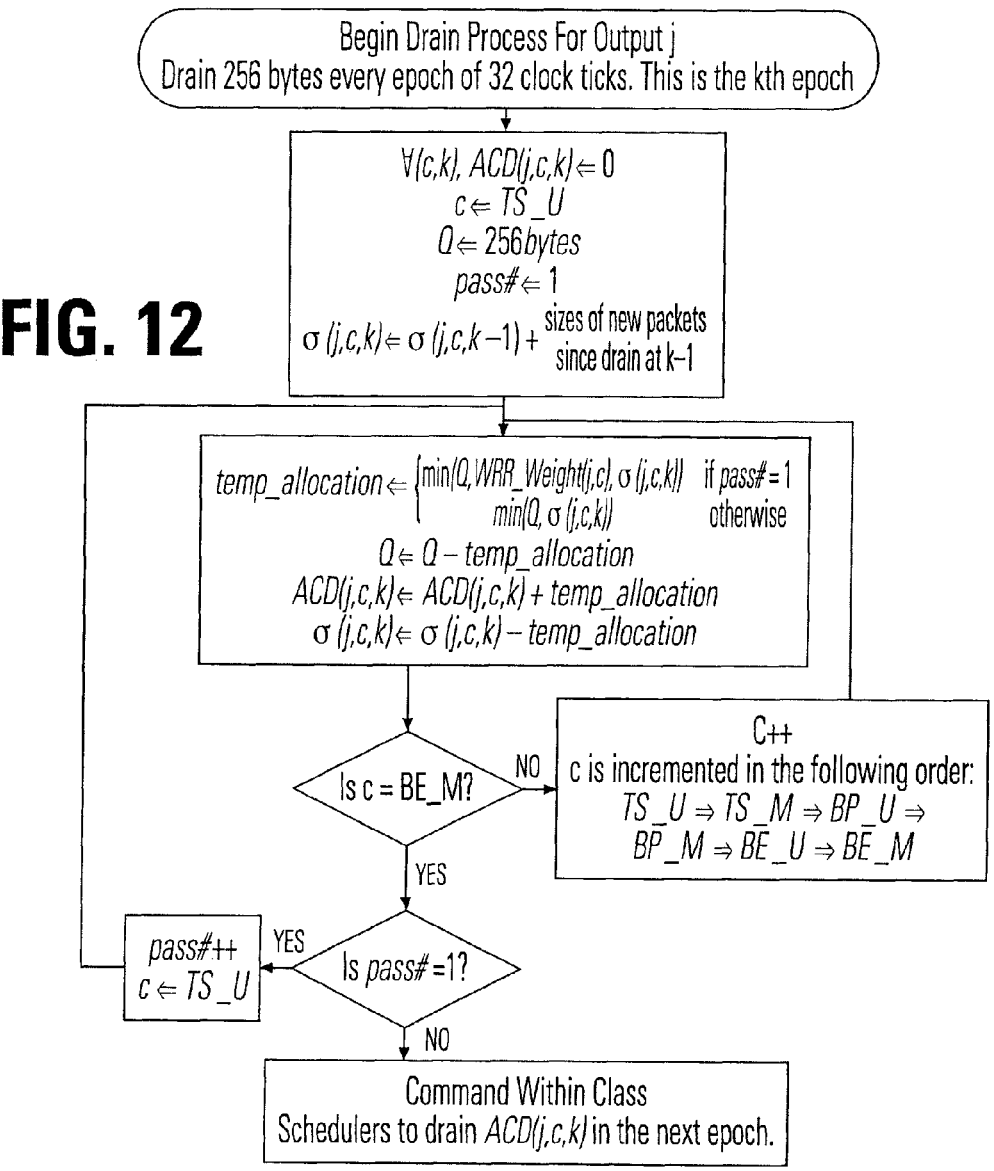
FIG. 12 is a flow chart illustrating the logic of an across-class scheduler.

The draining of the T-LBs is accomplished with an iterative algorithm that drains a quantum (Q) amount of fluid from the set of T-LBs associated with output j, every 32 clock ticks. The algorithm uses a Weighted Round Robin (WRR) algorithm to allocate the draining between BE Unicast, BP Unicast, TS Multicast, BE Multicast, BP multicast, and TS Multicast. Each of these 6 classes is programmed with a class weighting in the register configuration. FIG. 12 is a flow chart illustrating the logic of the across class scheduler. The figure shows how the levels of the 6 Output-Class buckets, denoted by $\sigma(j,c,k)$, are computed. The Across class scheduler also tells the within class scheduler for BE_U and BP_U how much was subtracted from $\sigma(j, BE\_U, k)$ and $\sigma(j, BP\_U, k)$ respectively, and then each within class scheduler distributes this drain amount to the thread level buckets.

Figure 13:
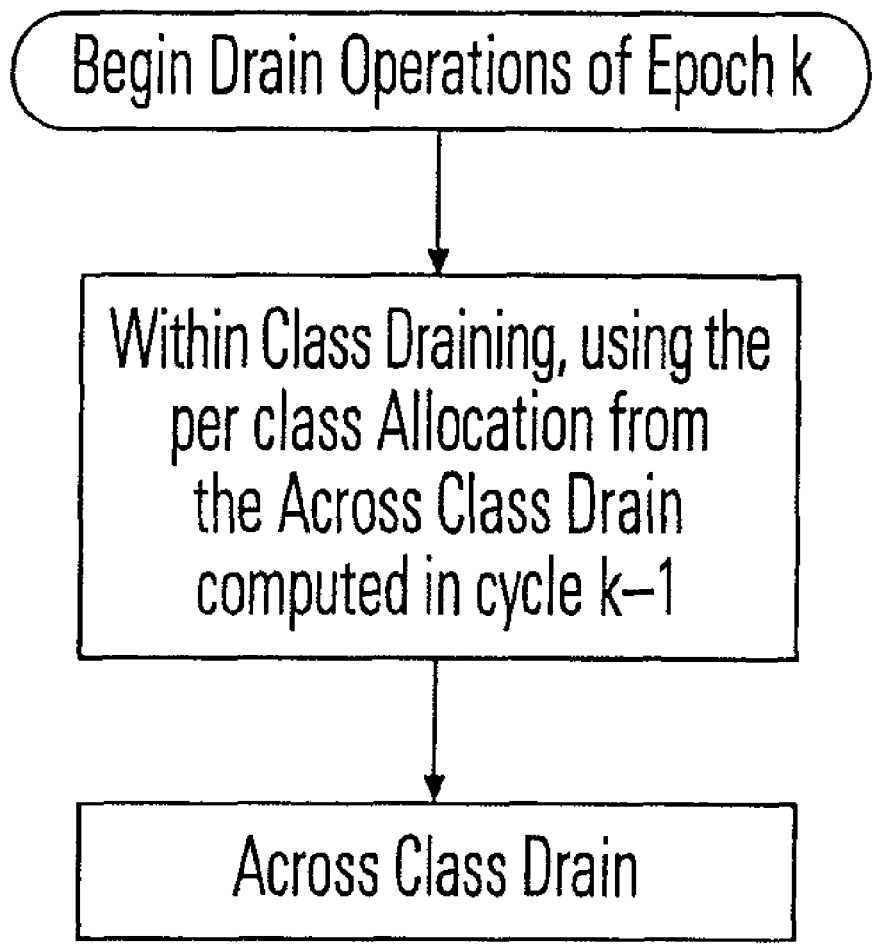
FIG. 13 is a flow chart illustrating which operations of the draining algorithm occur in which epoch.
Figure 14:
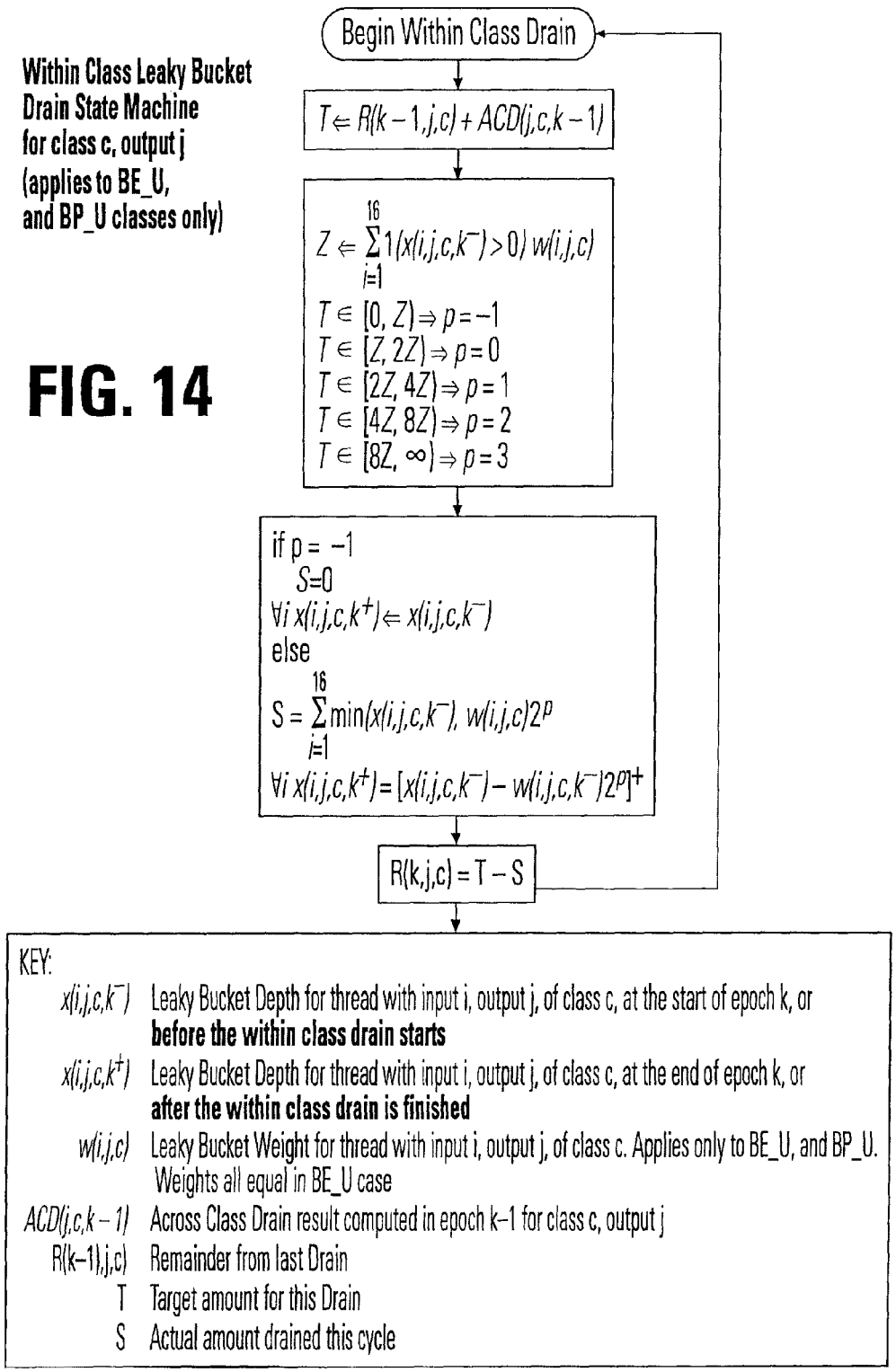
FIG. 14 is a flow chart illustrating the logic of the within-class allocation.

Once the WRR decides how much to drain from the 6 classes, the Across Class Allocator commands the Within Class Allocators for BE_U and BP_U to drain the allocated amount of fluid from its bucket(s). For the BE_U and BP_U classes, the quantum is divided among the 16 T-LBs using the powers of 2 algorithm. FIG. 14 is a flow chart illustrating the logic of the within class allocation using the powers of 2 algorithm. FIG. 13 is a flow chart illustrating which operations of the draining algorithm occur in which epoch. As shown, the Within Class drain algorithms operate at the beginning of an epoch (32 clock ticks), using the across class drain information computed from epoch k−1. The across class drain of epoch k happens immediately after the within class drain operations of epoch k are completed.

The powers of 2 algorithm used by the within class drain is an approximate algorithm, which carries a remainder from cycle to cycle. The algorithm preferably is designed in such a way to ensure that:

$$\left[R(j, c, k-1) + \sum_{i=1}^{16} x(i, j, c, k-1)\right] - ACD(j, c, k-1) =$$

$$\left[R(j, c, k) + \sum_{i=1}^{16} x(i, j, c, k^+)\right]$$

In other words, the sum of the thread leaky buckets and remainder term will be reduced by exactly the amount of the commanded across class drain of that epoch. Note that if the within class algorithm were not an approximation, the above would be true, but the remainder term, R(j,c,k) would be equal to zero for all k.

Note that the sum of the thread leaky buckets and the remainder term is always reduced by exactly the amount of the commanded across class drain, which is also the amount that is reduced by each epoch. Also note that the sum of the leaky buckets and remainder term grow whenever a packet arrives for that output of that class, and grows by the same amount that $\sigma(j,c,k)$ grows by. Thus sum of the thread leaky buckets plus remainder term should evolve over time to track $\sigma(j,c,k)$. In other words:

$$\left[R(j, c, k) + \sum_{i=1}^{16} x(i, j, c, k^+)\right] = \sigma(j, c, k)$$

This confirms that the sum of the finer granularity thread buckets has the same amount of fluid as the corresponding Output-Class bucket minus a remainder term.
Leaky Bucket Thresholds.
Activate Backpressure: c=BE_U or BP_U $$x(i, j, c) > \max Y(c)\left[1 - \frac{\left(\sum_{c'=BE\_U} \sum_{i=1} x(i, j, c)\right)}{Xamc(c)}\right] \quad (EQ\ 1)$$

Release Backpressure: c=BE_U or BP_U $$x(i, j, c) < \alpha(c)\max Y(c)\left[1 - \frac{\left(\sum_{c'=BE\_U} \sum_{i=1} x(i, j, c)\right)}{Xamc(c)}\right] \quad (EQ\ 2)$$

Activate Backpressure: c=TS_U, BE_M, BP_M, or TS_M $$x(\ldots,j,c) > \alpha(c)T(c) \quad (EQ\ 3)$$

The . . . argument for input index reflects the fact that for these classes there is just a single bucket per class-output pair, unlike BE_U and BP_U which have 16 buckets per class-output pair.
Release Backpressure: c=TS_U, BE_M, BP_M, or TS_M $$x(\ldots,j,c) < \alpha(cOT(c) \quad (EQ\ 4)$$

Table II sets forth typical values for certain parameters above. These values may or may not be preferred in a particular embodiment.

TABLE II

| Parameter | Typical Value |
|---|---|
| maxX(BE) | 200 blocks |
| maxX(BP) | 200 blocks |
| maxY(BE) | 100 blocks |
| maxY(BP) | 100 blocks |
| α([all classes]) | 0.9 |
| T(TS_U) | 200 blocks |
| T(BE_M) | 200 blocks |
| T(BP_M) | 200 blocks |
| T(TS_M) | 200 blocks |

Link Backpressure $$M_i > LB \Rightarrow \text{Link Backpressure input } i \quad (EQ\ 5)$$

where $M_i$ is the memory occupancy due to the input port i.
Class Backpressure $$M > CBP(BE) \Rightarrow \text{Backpressure BE for all inputs} \quad (EQ\ 6)$$

$$M > CBP(BP) \Rightarrow \text{Backpressure BP and BE for all inputs} \quad (EQ\ 7)$$

$$M > CBP(TS) \Rightarrow \text{Backpressure TS, BP, and BE for all inputs} \quad (EQ\ 8)$$

Table III sets forth typical values for certain parameters above. These values may or may not be preferred in a particular embodiment.

TABLE III

| Parameter | Typical Value |
|---|---|
| CBP(TS) | 365 KB |
| CBP(BP) | 346 KB |
| CBP(BE) | 307 KB |
| LB | 96 KB |

For both Link and Class Backpressures, backpressure is released when the corresponding control variable falls below 0.85*(threshold for activating the backpressure).
Dynamic Determination of Thresholds in Multiple Cashmere Embodiments In an embodiment in which a Cashmere module can be used in a single module topology or in a multistage topology, the threshold value (HWM) for microbundle LBs or thread LB that determines when a backpressure needs to be asserted or released for a thread is dynamic. It is computed whenever a change happens to the sum of the contents of the thread leaky buckets of the first stage or the microbundle sum changes in the second stage. The equation below shows how the threshold value is calculated.

$$\text{Threshold} = \max\theta\left(1 - \left(\frac{\sum \text{sum}}{\max xum}\right)^2\right)$$

Figure 15:
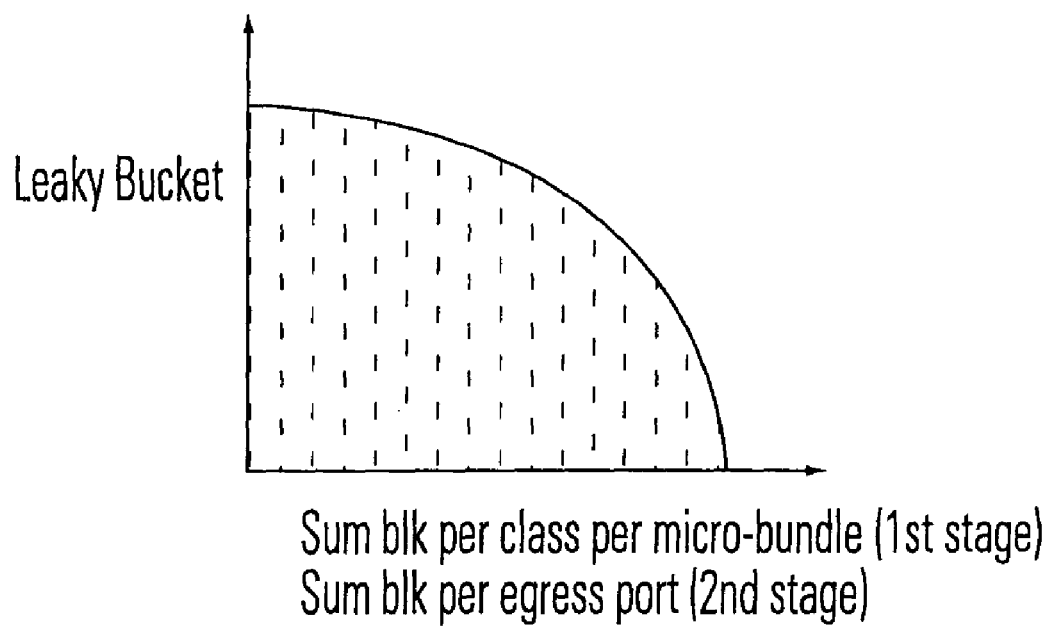
FIG. 15 shows varying backpressure assertion thresholds for a multistage topology.

FIG. 15 shows the varying threshold based on the sum of blocks per microbundle or per destination module depending on the stage of the fabric. On the first stage, the base (x-axis) is the sum of all blocks per class per eight threads (1 uB). The second stage, the x-axis is the sum of blocks across all classes destined to a specific egress port (includes unicast & multicast). The y axis always shows the volume of the leaky bucket. If the leaky bucket's volume is greater than the threshold, a backpressure message is generated.

The dynamic threshold is implemented as a stepping function with sixteen steps. Another embodiment might use 32 steps. The steps are of equal increment on the x-axis and programmable on the y-axis. The programmable feature permits changes based on the results of usage in actual networks.

The sixteen programmable levels are achieved through eight 32-bit CSRs with each CSR holding two 16-bit programmable levels. Each level is programmed in blocks, achieving 64 k blocks per value. In reality, the maximum requirement is 32 k for the DBS (Device Based Sets), 8 k for the microbundles, and 4 k for the thread base leaky bucket.

Figure 16:
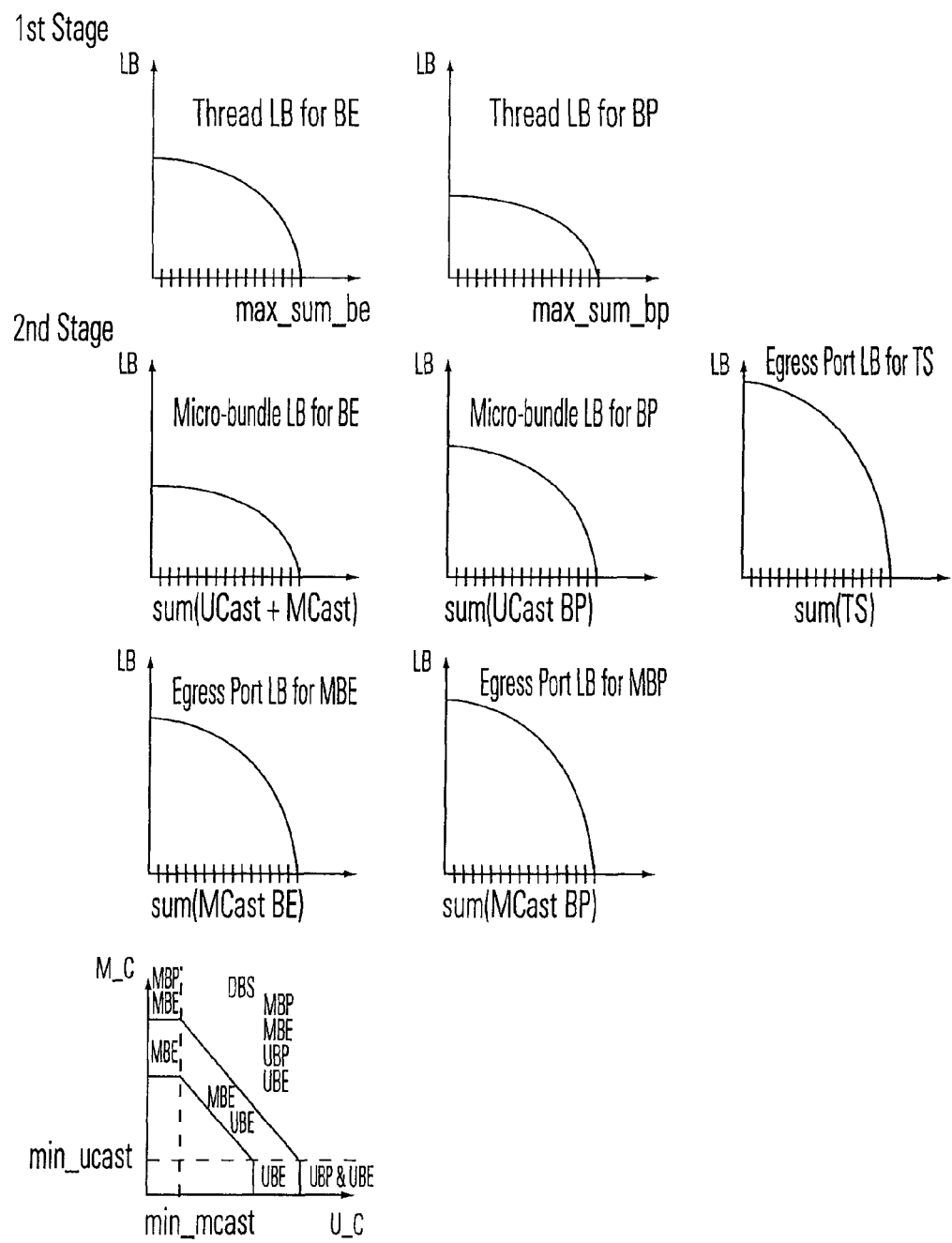
FIG. 16 shows the thresholds of FIG. 15 broken down by stages, type of leaky bucket, and device base memory management.

FIG. 16 shows the threshold calculation broken down by stages, different types of leaky buckets, and device base memory management. Each leaky bucket has 16 Xon & 16 Xoff programmable thresholds and one programmable max_sum (max_phi) per class.

In the first stage, there are leaky buckets and their phi is the summation of traffic per microbundle per class. In the 2nd stage, there are leaky buckets and DBS(s). The leaky buckets are separated into two type (unicast & multicast) of traffic and their phi(s) are the summation of type and class. The only exception is the phi for the unicast BE. For this the phi is the summation of all traffic across classes and types.

The DBS has two counters, one for unicast and the other for multicast traffic. Many programmable thresholds are required: min_mcast, min_ucast, ucast_xon_be, ucast_xoff_be, ucast_xon_bp, ucast_xoff_bp, mcast_xon_be, mcast_xoff_be, mcast_xon_bp, mcast_xoff_bp, dbs_xon_be, dbs_xoff_be, dbs_xon_bp, & dbs_xoff_bp. The purpose of the min_mcast & min_ucast is to prevent false backpressure of the other type of traffic. The DBS threshold protects the device memory and is compared against the sum(ucast+mcast).

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Also as used herein, the act of "exceeding" a particular number is the same thing as increasing at least to a point equal to the next higher number; "falling below" a particular number is the same thing as decreasing at least to a point equal to the next lower number. It can be appreciated, for example, that the act of increasing to a number X is the same as the act of exceeding the number X-1.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. For example, a packet size specified as number of blocks does not directly specify the number of bytes it contains, but if the number of bytes per block is known, then it nevertheless does "identify" the size of the packet in bytes. In addition, the term "indicate" is used herein to mean the same as "identify".

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. Switching apparatus comprising:
an output port;
a plurality of sets of input queues, at least one of said sets having more than one of said input queues; and
a queue scheduler corresponding to each of said sets of input queues, each given one of said queue schedulers operable to schedule packets for transmission toward said output port from among the input queues in the set corresponding to the given scheduler, in dependence upon the states of input queues in the set corresponding to the given scheduler and without regard to state of the input queues in any others of said sets, wherein:
no centralized controller affects transmission of packets through the switching apparatus;
the switching apparatus comprises an input stage, an intermediate stage and an output stage, said input queues being disposed in said input stage and said output port being disposed in said output stage, said intermediate stage having a plurality of alternative routes via which packets from each of said input queues can be forwarded toward said output port;
the input stage comprises a plurality of input modules, where each input module comprises a different per-thread monitor operable to monitor a different thread and assert thread backpressure signals for the thread, wherein each thread comprises data received from a single input port of the apparatus and transmitted to a single output port of the apparatus;
the intermediate stage comprises a plurality of intermediate modules, where each intermediate module comprises a different per-microbundle monitor operable to monitor a different microbundle flow, each microbundle flow consisting of a plurality of threads sharing a common input module; and
the output stage comprises a plurality of output modules.

2. Apparatus according to claim 1, wherein each of said sets of input queues is disposed on a separate input module, and the queue scheduler corresponding to each of said sets of input queues is disposed on the same module as its input queues.

3. Apparatus according to claim 1, wherein a particular one of said queue schedulers is responsive to a backpressure signal that is specific to a particular subset of less than all of the input queues from which the particular scheduler schedules packets for transmission toward said output port, said particular scheduler operable to schedule packets for transmission toward said output port from among only those (if any) of its input queues that are not subject to said backpressure signal.

4. Apparatus according to claim 3, wherein said particular subset contains only one input queue.

5. Switching apparatus comprising:
a plurality of sets of output ports;
a plurality of input queues operable to store incoming packets destined for said output ports; and
a queue scheduler corresponding to each of said sets of output ports, each given one of said queue schedulers operable to schedule only those packets in said input queues which are destined for the output ports in the set corresponding to the given queue scheduler, and to do so without regard to packets destined for other output ports, wherein:
no centralized controller affects transmission of packets through the switching apparatus;
the switching apparatus comprises an input stage, an intermediate stage and an output stage, said input queues being disposed in said input stage and said output ports being disposed in said output stage, said intermediate stage having a plurality of alternative routes via which packets from each of said input queues can be forwarded toward said output ports;
the input stage comprises a plurality of input modules, where each input module comprises a different per-thread monitor operable to monitor a different thread and assert thread backpressure signals for the thread, wherein each thread comprises data received from a single input port of the apparatus and transmitted to a single output port of the apparatus;
the intermediate stage comprises a plurality of intermediate modules, where each intermediate module comprises a different per-microbundle monitor operable to monitor a different microbundle flow, each microbundle flow consisting of a plurality of threads sharing a common input module; and
the output stage comprises a plurality of output modules.

6. Apparatus according to claim 5, wherein each of said sets of output ports contains exactly one output port.

7. Apparatus according to claim 5, wherein said given queue scheduler is responsive to a backpressure signal that is specific to a particular subset of less than all of said input queues, said given queue scheduler operable to schedule packets for transmission from among only those (if any) of said input queues that are not subject to said backpressure signal.

8. Apparatus according to claim 7, wherein said particular subset contains exactly one input queue and the set of output ports corresponding to said given queue scheduler contains exactly one output port.

9. Switching apparatus comprising:
a plurality of sets of output ports;
a plurality of sets of input queues, at least one of said sets of input queues having more than one of said input queues; and
a queue scheduler corresponding to each pair of one of said sets of input queues and one of said sets of output ports, each given one of said queue schedulers operable to schedule packets for transmission toward its corresponding set of output ports from among the input queues in its corresponding set of input queues, in dependence upon the states of input queues in its corresponding set of input queues, without regard to state of the input queues in any others of said sets, and without regard to packets destined for other output ports, wherein:
no centralized controller affects transmission of packets through the switching apparatus;
the switching apparatus comprises an input stage, an intermediate stage and an output stage, said input queues being disposed in said input stage and said output ports being disposed in said output stage, said intermediate stage having a plurality of alternative routes via which packets from each of said input queues can be forwarded toward each of said output ports;
the input stage comprises a plurality of input modules, where each input module comprises a different per-thread monitor operable to monitor a different thread and assert thread backpressure signals for the thread, wherein each thread comprises data received from a single input port of the apparatus and transmitted to a single output port of the apparatus;
the intermediate stage comprises a plurality of intermediate modules, where each intermediate module comprises a different per-microbundle monitor operable to monitor a different microbundle flow, each microbundle flow consisting of a plurality of threads sharing a common input module; and
the output stage comprises a plurality of output modules.

10. Apparatus according to claim 9, wherein each of said sets of output ports contains exactly one output port.

11. Apparatus according to claim 9, wherein each of said sets of input queues is disposed on a separate input module, and the queue scheduler corresponding to each of said sets of input queues is disposed on the same module as its input queues.

12. Apparatus according to claim 9, wherein a particular one of said queue schedulers is responsive to a backpressure signal that is specific to a particular subset of less than all of the input queues from among which the particular scheduler schedules packets for transmission toward its corresponding set of output ports, said particular scheduler operable to schedule packets for transmission toward its corresponding set of output ports from among only those (if any) of its input queues that are not subject to said backpressure signal.

13. Apparatus according to claim 12, wherein said particular subset of input queues contains only one input queue.

14. Switching apparatus comprising:
an input stage having a plurality of sets of input queues;
an output stage having a plurality of output ports;
an intermediate stage having a plurality of alternative routes via which packets from each of said input queues can be forwarded toward each of said output ports; and
a queue scheduler corresponding to each pair of one of said sets of input queues and one of said output ports, each given one of said queue schedulers operable to schedule packets for transmission toward its corresponding output port from among only the input queues in its corresponding set of input queues, and operable to do so in dependence upon the states of input queues in its corresponding set of input queues, without regard to state of the input queues in any others of said sets, and without regard to packets destined for other output ports, wherein:
no centralized controller affects transmission of packets through the switching apparatus;
the input stage comprises a plurality of input modules, where each input module comprises a different per-thread monitor operable to monitor a different thread and assert thread backpressure signals for the thread, wherein each thread comprises data received from a single input port of the apparatus and transmitted to a single output port of the apparatus;
the intermediate stage comprises a plurality of intermediate modules, where each intermediate module comprises a different per-microbundle monitor operable to monitor a different microbundle flow, each microbundle flow consisting of a plurality of threads sharing a common input module; and
the output stage comprises a plurality of output modules.

15. Apparatus according to claim 14, wherein each particular one of said queue schedulers is responsive to a respective backpressure signal indicating overutilization of bandwidth capacity of the output port toward which the particular queue scheduler schedules packets for transmission, the backpressure signals being specific to a particular subset of less than all of the input queues from among which the particular scheduler schedules packets, the particular scheduler being operable to schedule packets for transmission toward its corresponding output port from among only those (if any) of its input queues that are not subject to said backpressure signal.

16. A multi-stage switch fabric comprising:
an input stage having a plurality of input modules;
an intermediate stage connected to the input stage and having a plurality of intermediate modules; and
an output stage connected to the intermediate stage and having a plurality of output modules, each output module has one or more output ports, wherein the multi-stage switch fabric has:
one or more per-microbundle monitors, each operable to monitor a microbundle flow of a corresponding output port and assert microbundle backpressure signals for the microbundle flow, each microbundle flow having a plurality of threads; and
one or more per-thread monitors, each operable to monitor a different thread and assert thread backpressure signals for the thread, wherein:
no centralized controller affects transmission of packets through the multi-stage switch fabric;
each input module in the input stage comprises a different per-thread monitor operable to monitor a different thread and assert thread backpressure signals for the thread, wherein each thread comprises data received from a single input port of the apparatus and transmitted to a single output port of the apparatus; and each intermediate module in the intermediate stage comprises a different per-microbundle monitor operable to monitor a different microbundle flow, each microbundle flow consisting of a plurality of threads sharing a common input module.

17. The multi-stage switch fabric of claim 16, wherein each per-microbundle monitor is implemented outside of the output stage.

18. The multi-stage switch fabric of claim 17, wherein each per-microbundle monitor is implemented in the intermediate stage.

19. A multi-stage switch fabric comprising:

an input stage having a plurality of input modules;

an intermediate stage connected to the input stage and having a plurality of intermediate modules; and an output stage connected to the intermediate stage and having a plurality of output modules, each output module has one or more output ports, wherein the multi-stage switch fabric has:

one or more microbundle leaky buckets, each operable to monitor a microbundle flow of a corresponding output port, each microbundle flow having a plurality of threads; and one or more thread leaky buckets, each operable to monitor a different thread, wherein:

no centralized controller affects transmission of packets through the multi-stage switch fabric;

each input module in the input stage comprises a different thread leaky bucket operable to monitor a different thread and assert thread backpressure signals for the thread, wherein each thread comprises data received from a single input port of the apparatus and transmitted to a single output port of the apparatus; and each intermediate module in the intermediate stage comprises a different microbundle leaky bucket operable to monitor a different microbundle flow, each microbundle flow consisting of a plurality of threads sharing a common input module.

* * * * *